United States Patent [19]
Ulrich et al.

[11] Patent Number: 5,474,818
[45] Date of Patent: * Dec. 12, 1995

[54] FLEXIBLE CONTAINER WITH NONSTICK INTERIOR

[75] Inventors: Helga H. Ulrich, Appleton, Wis.; James R. Quick, Greenwood Lake, N.Y.; Barry L. Hess, Appleton, Wis.

[73] Assignee: International Paper, Purchase, N.Y.

[*] Notice: The portion of the term of this patent subsequent to Jan. 26, 2010, has been disclaimed.

[21] Appl. No.: 9,486

[22] Filed: Jan. 26, 1993

Related U.S. Application Data

[63] Continuation-in-part of Ser. No. 883,747, May 15, 1992, Pat. No. 5,181,610.

[51] Int. Cl.[6] ............................................. B65D 30/02
[52] U.S. Cl. ..................... 428/34.3; 428/34.2; 428/352; 428/121; 428/172; 428/192; 383/107; 383/116; 383/211; 206/447
[58] Field of Search ................... 428/34.3, 34.2, 428/34.1, 449, 452, 431, 511, 512, 513, 514, 352, 152, 121, 172, 192; 383/107, 116, 210, 211; 206/447

[56] References Cited

U.S. PATENT DOCUMENTS

| | | | |
|---|---|---|---|
| 3,873,735 | 3/1975 | Chalin | 428/87 |
| 4,160,852 | 7/1979 | Torterotot et al. | 428/192 |
| 4,447,499 | 5/1984 | Swihart et al. | 428/447 |
| 4,454,266 | 6/1984 | Coughlan | 524/44 |
| 4,533,600 | 8/1985 | Coughlan | 428/414 |
| 4,543,280 | 9/1985 | Fujita et al. | 428/35 |
| 4,549,653 | 10/1985 | Lauritzen | 206/441 |
| 4,569,879 | 2/1986 | Groves | 428/198 |
| 4,572,753 | 2/1986 | Bach | 156/73.1 |
| 4,614,677 | 9/1986 | Pennace et al. | 428/40 |
| 4,684,557 | 8/1987 | Pennace et al. | 428/40 |
| 4,797,446 | 1/1989 | Dietlein et al. | 524/860 |
| 4,830,924 | 5/1989 | Dallavia, Jr. | 428/429 |

FOREIGN PATENT DOCUMENTS

| | | |
|---|---|---|
| 910735 | 9/1972 | Canada. |
| 4284237 | 10/1990 | Japan. |

*Primary Examiner*—James J. Seidleck
*Assistant Examiner*—Michael A. Williamson
*Attorney, Agent, or Firm*—Michael J. Doyle

[57] ABSTRACT

A pouch suitable for packaging disposable consumer products having a pressure sensitive adhesive coated on a portion of a surface thereof. The pouch is formed from a silicone polymer coated paper with the silicone coating forming an internal surface of the pouch, thereby allowing easy removal of the product from the pouch and avoiding permanent sticking of the pressure sensitive adhesive coating to the pouch material. The silicone polymer coated paper used to form the pouch has, as a part of the composition thereof, a thermoplastic component which can be a thermoplastic basecoat, or an admixed thermoplastic polymer included in the silicone polymer coating, or a thermoplastic coating on the surface of the paper opposite the silicone coating, or combinations of these alternatives. In all cases, the thermoplastic component is provided in the form of a water-based emulsion or dispersion of a thermoplastic polymer, such as an emulsion of an ethylene vinyl acetate copolymer. The pouch is sealed along at least one edge where two layers of material are joined, the inward facing surface of at least one of the layers being silicone coated. The edge seal is formed by a process that provides simultaneous heating and embossing effects in the seal area.

14 Claims, 8 Drawing Sheets

FIG. 1
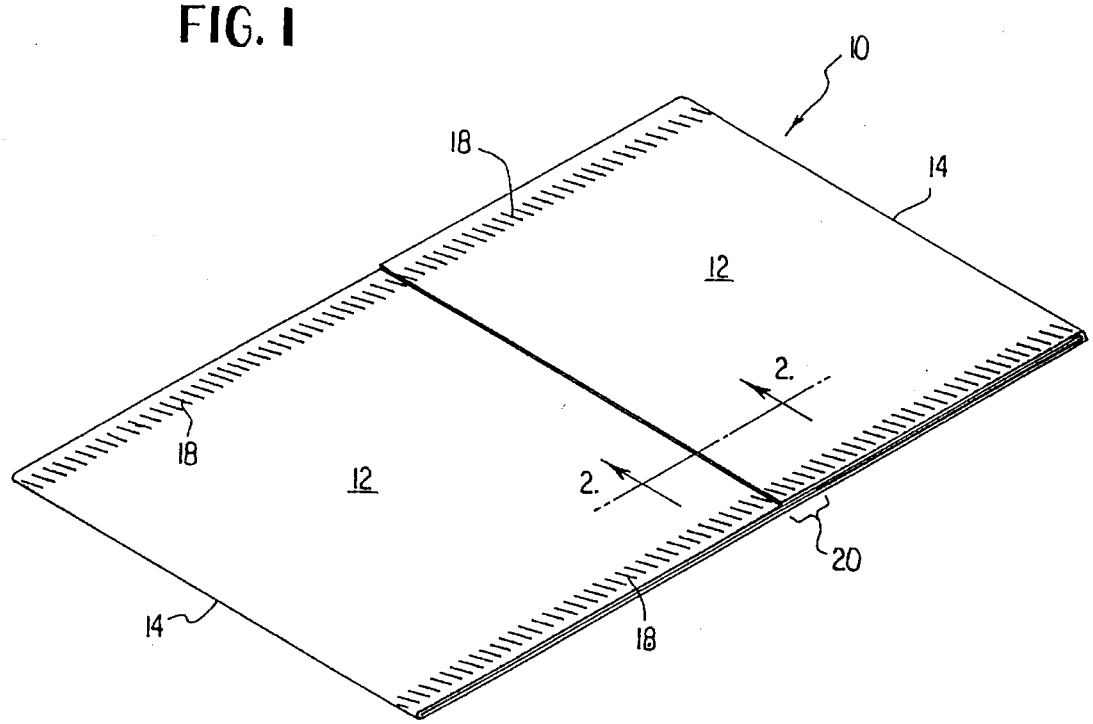
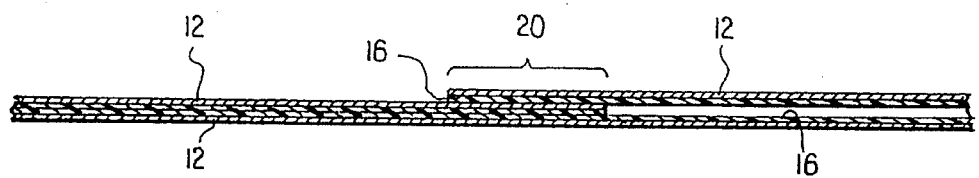
FIG. 2

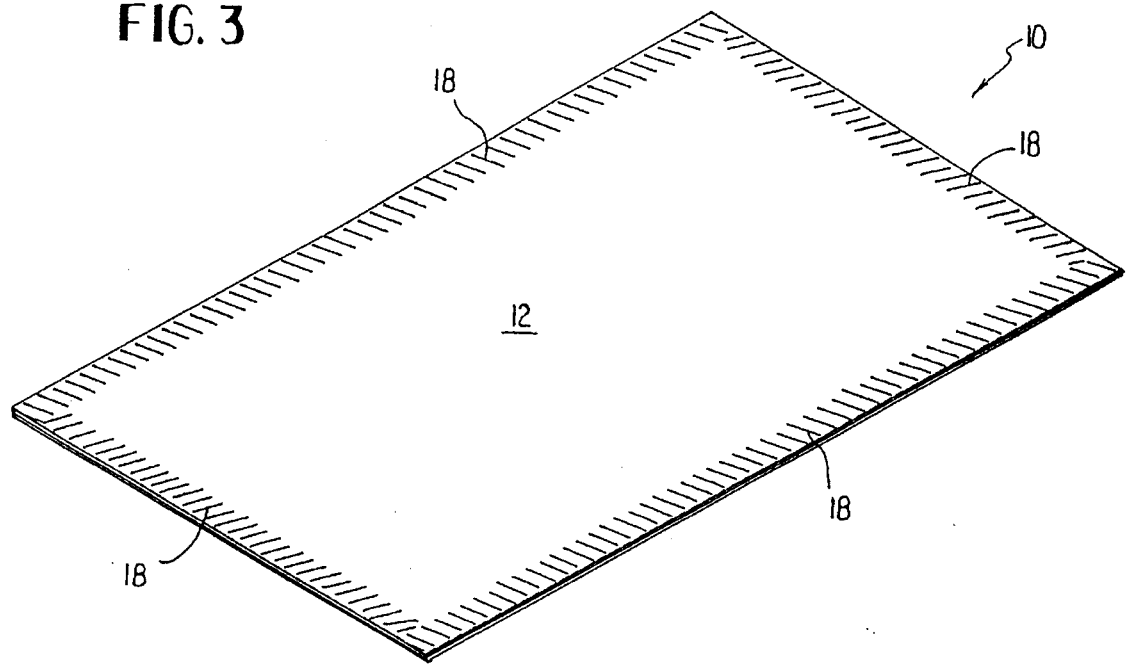
FIG. 3
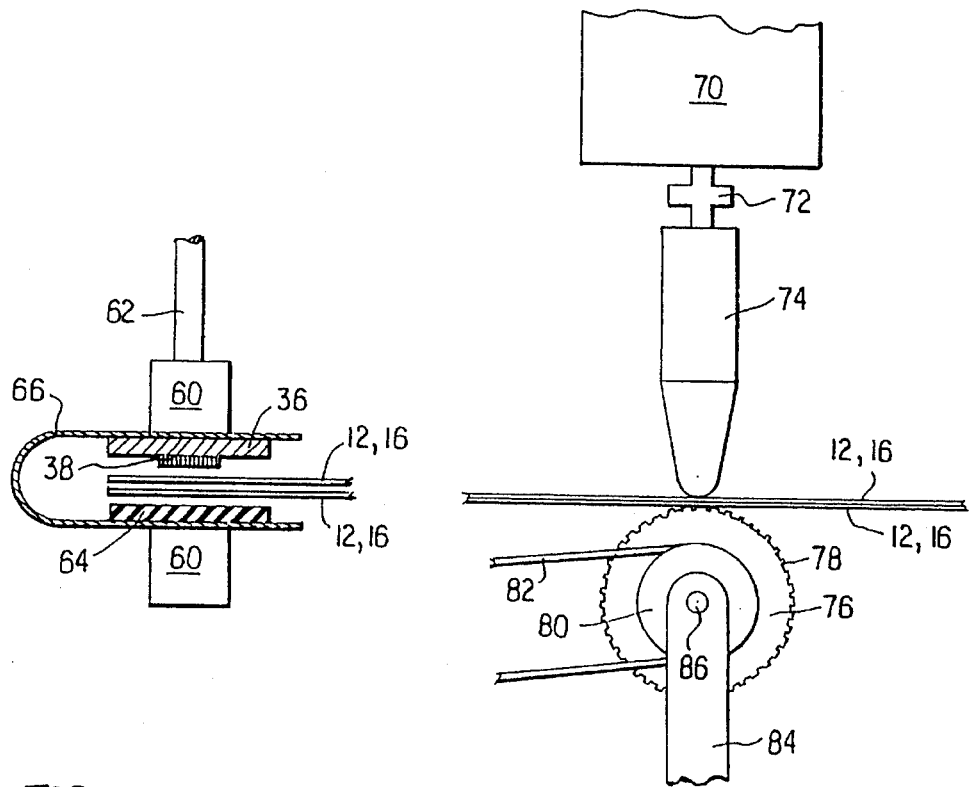
FIG. 11
FIG. 12

FIG. 8
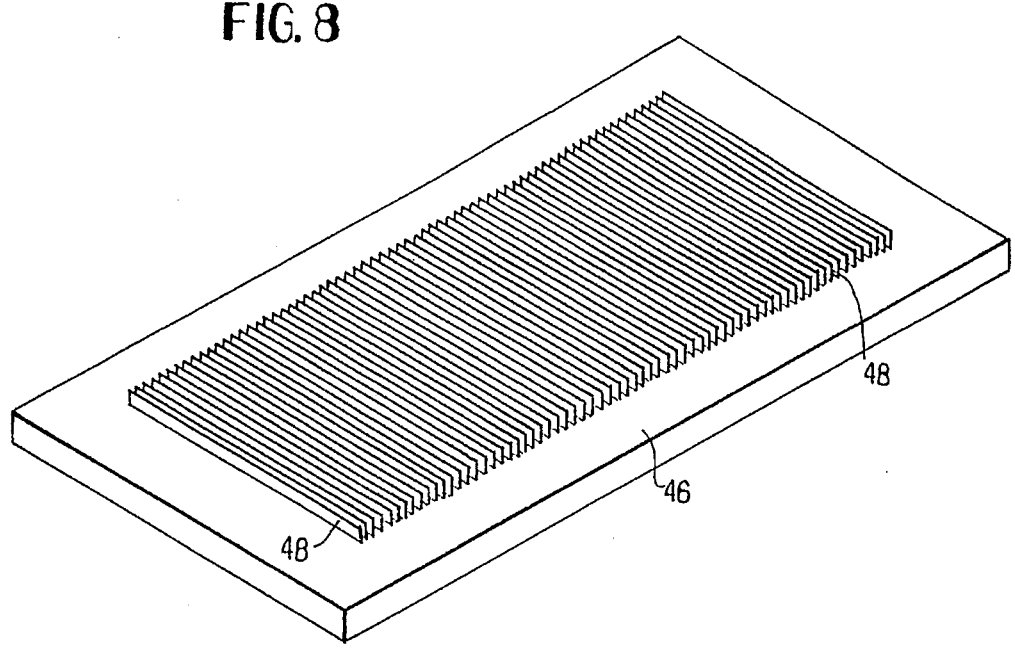
FIG. 9
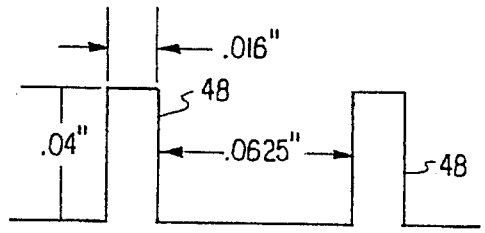
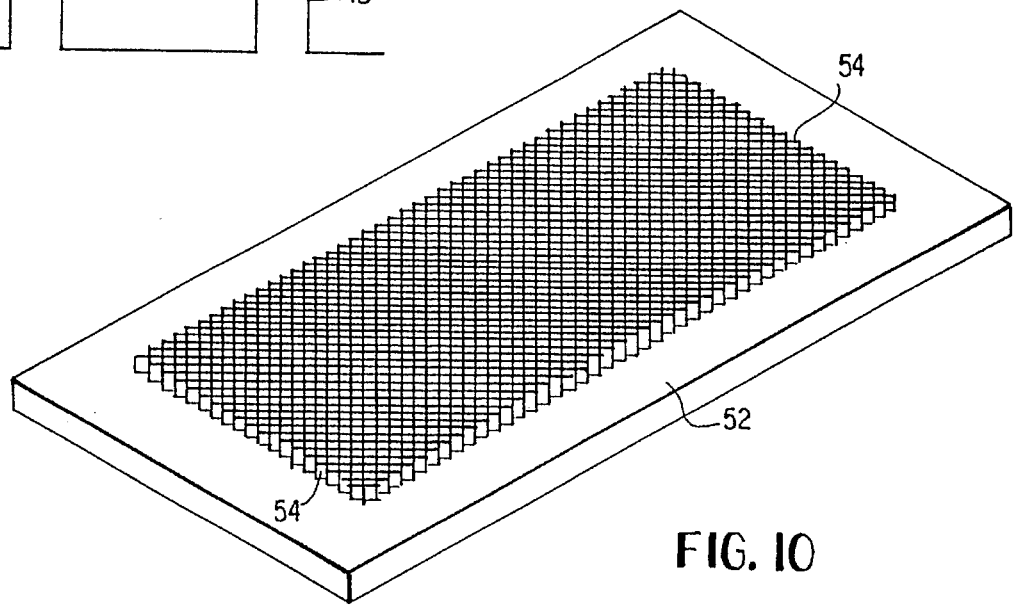
FIG. 10

FIG. 15
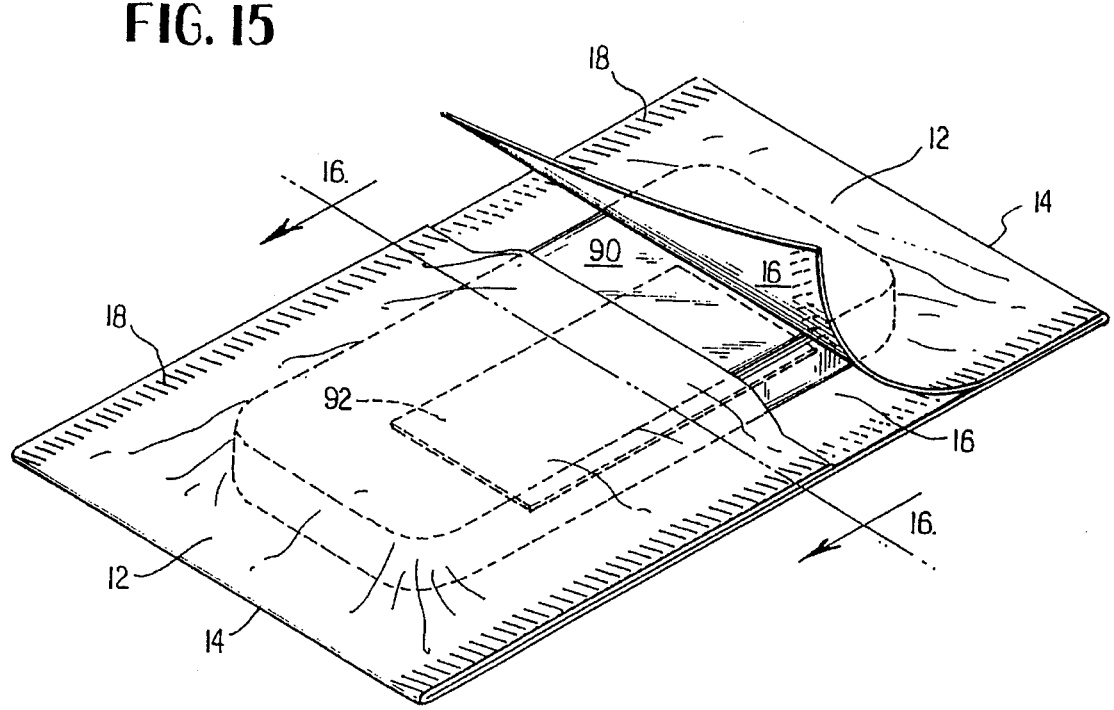
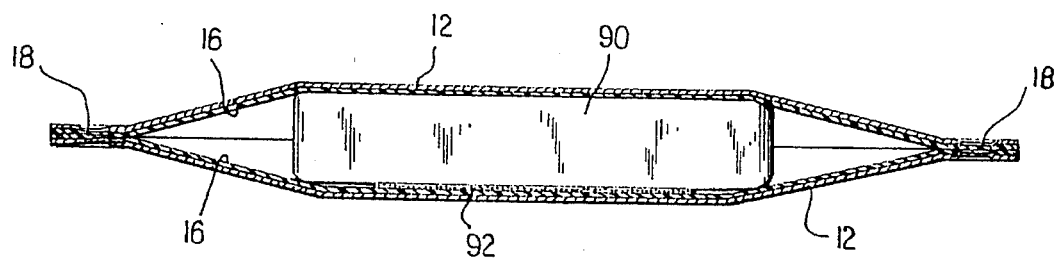
FIG. 16

FLEXIBLE CONTAINER WITH NONSTICK INTERIOR

BACKGROUND OF THE INVENTION

This is a Continuation-In-Part of Ser. No. 07/883,747, filed May 15, 1992 entitled FLEXIBLE CONTAINER WITH NONSTICK INTERIOR, by James R. Quick et al, now U.S. Pat. No. 5,181,610.

This invention relates to containers and more particularly to a flexible container for holding sanitary napkins or other relatively flat objects.

Sanitary napkins are often provided with a silicone-coated release liner for pressure sensitive adhesive on the sanitary napkin. The napkin with the release liner in place is packaged in a relatively small pouch. For purposes of cost reduction, packet simplification, and reduced solid waste, it would be desirable to combine the release liner and the pouch or container into a single item. For this to be accomplished, it would be necessary to form a pouch from a silicone coated paper or silicone coated plastic film. Because of the nonstick characteristic of silicone, however, it has not been known prior to this invention to form the seams of a pouch using silicone coated paper or plastic film. The prior art does not provide a method of forming flexible containers such as pouches from silicone coated paper and films and similar materials, where the design of the container is such that the seams are formed with the silicone coated surfaces facing inwards. An approach taken in the prior art involves zone coating of the silicone coating on either a paper with a sealable (thermoplastic) basecoat or on a plastic film, so that there is no silicone in those areas that will be joined to form the seams of the pouch, thereby permitting conventional heat sealing to form the seams. Although this prior art method works satisfactorily, it is complex and expensive because it not only requires zone coating of the silicone on the paper or film it also requires that the zoned pattern be held in register in the pouch-forming process.

SUMMARY OF THE INVENTION

According to the practice of this invention, a novel method is employed for the formation of flexible containers such as pouches, bags, or envelopes which have an interior surface coated with a composition which has nonstick characteristics and which lacks the thermoplastic characteristics of conventional heat sealing for forming seams by heat sealing. More specifically, the nonstick coating, as in silicone coated paper or silicone coated plastic film, is located on the interior of the pouch, with the pouch seams formed by joining the plies of material with the coated surfaces of the plies facing inward and defining the interior surface of the pouch. In this manner, the usual release liner, which covers and protects the adhesive of the sanitary napkin, is not required.

In general, the method of this invention is carried out by coating paper or plastic film with a nonstick coating, sometimes termed a release coating, such as a silicone polymer coating, then forming one or more plies of the silicone coated material into a closed pouch with the silicone coating facing inwardly of the pouch, then sealing one or more edges or edge zones of the pouch to define edge seams by a bonding process which embosses the plies of material being joined. This bonding process transmits energy to the embossed or edge seam area in the form of heat or ultrasonic vibrational energy. Silicone coated paper or plastic film is a staple item of commerce.

BRIEF DESCRIPTION OF THE DRAWINGS

FIG. 1 is a perspective view of a pouch formed in accordance with this invention.

FIG. 2 is a view taken along section 2—2 of FIG. 1.

FIG. 3 is a perspective view of another pouch formed in accordance with this invention.

FIG. 8 is a perspective view of another form of embossing plate for forming embossments for the seams of the pouch of this invention.

FIG. 9 is a cross sectional view illustrating the upper structure of the embossing plate of FIG. 8.

FIG. 10 is a perspective view of another embossing plate used to form embossments for the seams of the pouch of this invention.

FIG. 11 is a partially schematic sectional view illustrating a hot embossing plate apparatus for forming the seams of a pouch according to the invention.

FIG. 12 is a partially schematic view illustrating an ultrasonic apparatus for forming the seams of the pouch of this invention.

FIG. 15 is a partially schematic perspective view of the pouch of FIG. 1 partially opened, and shows a sanitary napkin in the pouch.

FIG. 16 is a view taken along section 16—16 of FIG. 15.

DETAILED DESCRIPTION OF THE INVENTION

Figure 4:
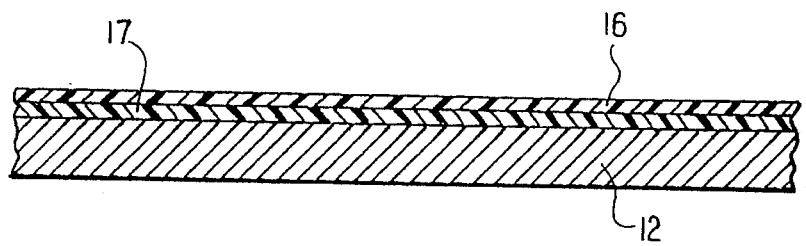
FIG. 4 is a cross sectional view illustrating one form of sheet material used to form the pouch of this invention.

Referring now to FIGS. 1 and 2 of the drawings, the numeral 10 denotes generally a pouch formed in accordance with this invention and includes a paper sheet or plastic film sheet 12 of rectangular form bent and folded as indicated to define two integral folds 14 at opposite ends thereof. The paper sheet or plastic film sheet is coated on the inwards facing surface thereof with a coating 16 of a silicone polymer. Paper or plastic film coated with a silicone polymer coating is a staple item of commerce and may be obtained from Akrosil in Menasha, Wis. The side seams of pouch 10 are designated as 18 and are defined by embossments running along and defining opposite longitudinal edge zones of the pouch. The embossments are formed on those edge zones of the pouch which are not formed by the integral folds 14. As shown at both FIGS. 1 and 2, an overlapped portion, designated as zone 20, occurs with the overlap of the right hand portion of sheet 12 over the left hand portion of the pouch. At this overlap or zone 20, the silicone coating 16 is in contact with the upper surface of paper or plastic film 12. At all other portions along both of the side seams 18, the seams are formed with the opposing or facing silicone coatings 16 in surface to surface contact.

Referring now to FIG. 3, a modified form of the pouch 10 is shown wherein two rectangular layers of sheet material are used to form the pouch. All four sides, the complete periphery of the pouch, are embossed to form seams as indicated at 18. A pouch of the form shown in FIG. 3 may be made from two layers of sheet material of differing composition, and in some cases it will be preferable to have a silicone coating on the inward facing surface of only one of the two layers of sheet material in pouch 10.

Figure 5:
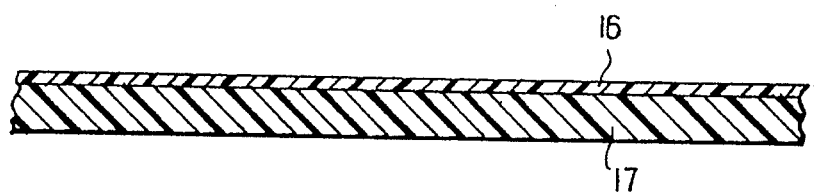
FIG. 5 is a cross sectional view of another sheet material used to form the pouch of this invention.

Referring now to FIG. 4 of the drawings, one form of the sheet material used to form the pouch of this invention is illustrated. A paper sheet 12 is coated with a base coat 17, for example a thermoplastic coating such as polyethylene, and a silicone coating 16 is applied over the polyethylene. Alternatively, as indicated at FIG. 5, the sheet material from which the pouch of this invention is formed may be defined by a plastic film 17, such as a polyethylene film, which is coated with layer 16 of silicone. Either of these two types of sheet materials and other flexible silicone coated sheet materials may be employed in carrying out the invention.

Figure 6:
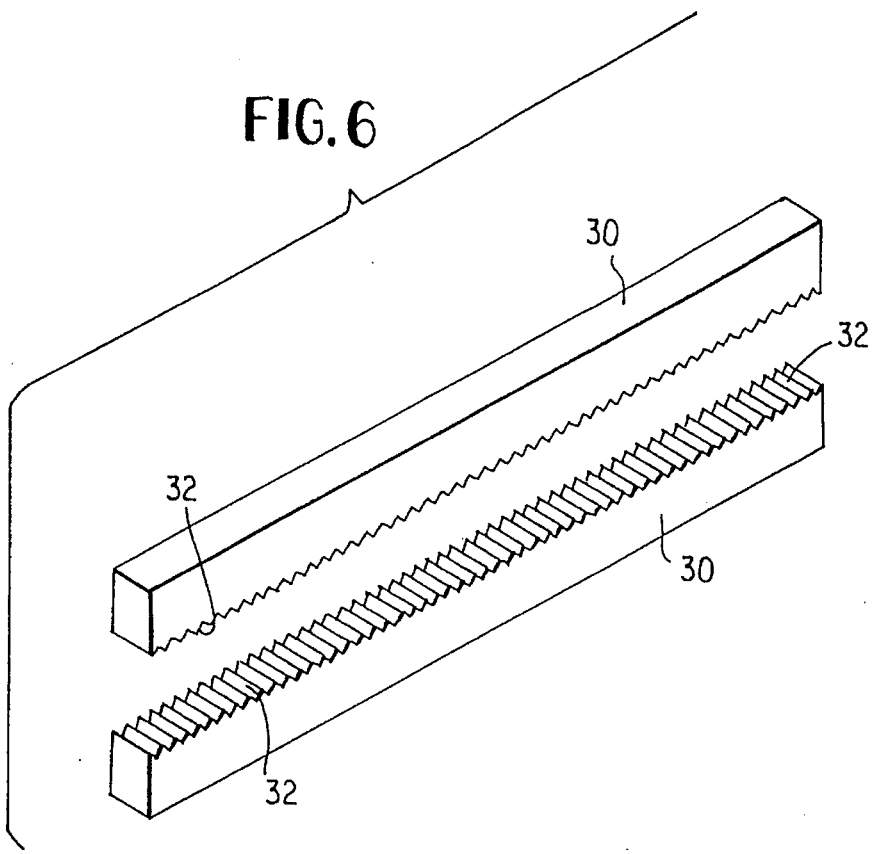
FIG. 6 is a perspective view illustrating two heated embossing bars for forming the seams of the pouch of this invention.

Referring now to FIG. 6 of the drawings, the numeral 30 designates either of two elongated, rectangular heated metal embossing bars each provided along one longitudinal surface with a plurality of serrations or teeth 32. While not illustrated, the metal bars 30 are electrically heated and are raised and lowered in respect to each other, as by hydraulic actuating elements on one of the two bars. It will be understood that such opposed heated metal bars which are moveable towards and away from each other for sealing purposes are, in general, known in the container-making art. To form the seam 18 of the pouch of this invention, the periphery to be embossed of sheets 12 of FIG. 3 or of sheet 12 of FIG. 1 is placed between the teeth 32 of the bars, and the bars are actuated to move towards each other to thereby emboss the sheet material to form one of the seams 18.

Figure 7:
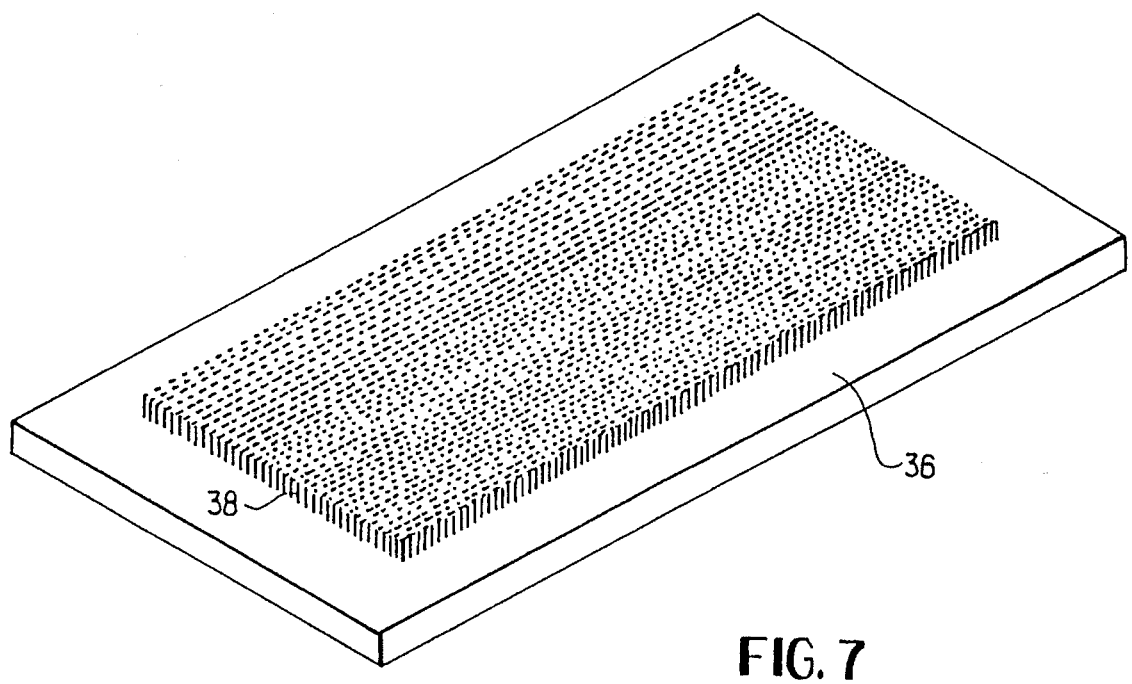
FIG. 7 is a perspective view of an embossing plate used to form embossments for the seams of the pouch of this invention.

Referring now to FIG. 7 of the drawings, a single embossing plate 36 is illustrated as having a rectangular array of integral projections 38. The dot pattern embossing plate of FIG. 7 is formed, typically, of glass fiber reinforced plastic. The use of this embossing plate will shortly be described.

Referring now to FIG. 8 of the drawings, another embossing plate is illustrated which may be described as a parallel line pattern embossing plate and is defined by a rectangular embossing plate 46, similar in material of construction and general form to that of FIG. 7, having a plurality of upstanding ridges 48. The ridges are parallel to each other and are integral with 46. FIG. 9 illustrates a typical transverse cross section, showing parallel elements 48 spaced approximately 0.0625 inches apart, having a thickness of approximately 0.016 inches and being of height of approximately 0.04 inches.

Referring now to FIG. 10 of the drawings, still another form of embossing plate is illustrated, also fashioned from the same material as described with respect to the embodiment of FIG. 7, with the plate designated as 52 and having a plurality of criss-crossed projections 54 to yield a criss-crossed pattern for seam 18.

Referring now to FIG. 11, any of the plates of FIGS. 7, 8, or 10 may be employed, with FIG. 11 illustrating the plate of FIG. 7. Each of a pair of elongated support members in the form of heated metal bars is denoted as 60, with the longitudinal axis of the support running towards the reader, perpendicular to the plane of the paper. A lifting rod 62 is actuable to raise and depress the upper bar 60 with respect to the lower bar, the latter being fixed. A rectangular rubber pad is indicated as 64, with the lower portion of pad 64 and the upper surface of embossing plate 36 secured, by an adhesive and by screws respectively, to facing surfaces of a U-shaped and preferably resilient metal member 66. Number 66 may be referred to as a metal carrier. In operation, a sheet material folded as shown in FIG. 1 or two plies of sheet material in the form shown in FIG. 3 are placed between the legs of the U-shaped metal carrier 66 and then positioned between the embossing plate 36 and rubber pad 64. It will be understood that the sheet material may be either that illustrated at FIG. 4 or at FIG. 5. With the sheet material in position, rod 62 is actuated to push upper bar 60 downwardly, so that the projections 38 on plate 36 engage, compress and deform the facing surfaces of the sheet material in the seam areas 18 as the sheet material is heated by heat transmitted from one or both metal bars 60 through embossing plate 36 and/or rubber pad 64. The reader will readily visualize that embossing plates 46 of FIG. 8 or 52 of FIG. 10 may also be employed with the apparatus of FIG. 11. As with the apparatus of FIG. 6, bars 60 are, conventionally, electrically heated, with upper bar 60 moveable by virtue of conventional actuators, such as hydraulic pistons.

Referring now to FIG. 12, an ultrasonic sewing apparatus is designated as 70, 72, and 74, with 70 designating an ultrasonic power converter, 72 denoting a power amplifier and 74 denoting an ultrasonic horn. All of these elements are conventional. The lower tip of horn 74 forms a nip with respect to a rotating anvil wheel 76, the latter preferably of a thickness approximate to the width of seam 18 which is to be formed in the pouch. The periphery of anvil wheel 76 is provided with a plurality of outwardly extending anvils or protuberances 78 having valleys or spaces between them. A pulley 80, driven by belt 82, is fixed to wheel 76 and rotates the latter. A support arm 84 having a pivot point 86 for the pulley and wheel is fixed. In operation, sheet material folded as in FIG. 1 or two plies of sheet material in the form shown in FIG. 3 are passed through the nip between anvil wheel 76 and the lower end of ultrasonic horn 74, with the sheet material translating from left to right or from right to left, depending on the direction of rotation of anvil wheel 76, to simultaneously form embossments on the seam areas 18 and transmit ultrasonic vibrational energy from horn 74 to the points of embossment. Embossed seals 18 are formed by compressing and deforming the silicone coated sheet material with localized heating due to the absorption of ultrasonic vibrational energy by the material.

Figure 13:
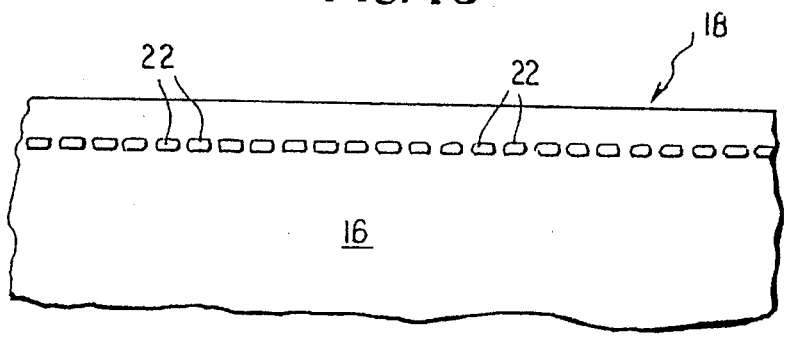
FIGS. 13 and 14 are partial plan views of two types of embossments along a portion of a seam of the pouch of this invention.
Figure 14:
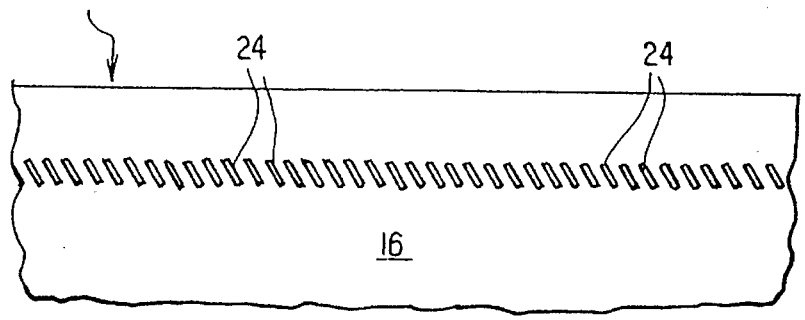

FIGS. 13 and 14 illustrate two typical embossed seams, FIG. 13 showing a pouch seam made by the apparatus of FIG. 11 with protuberances 78 of anvil wheel 76 being of a generally rectangular shape. The depressed portions of the embossments, made by protuberances 78, are denoted as 22. These depressions are deformations extending through silicone layers 16 and into the next adjacent layer or layers. In FIG. 14, the embossments are each denoted as 24 and also extend through the silicone layers 16 of the sheet material. Where there is an overlapped seam zone, such as zone 20 of FIG. 2, the embossments extend preferably through all of the silicone layers in the zone. Embossments such as 24, or 22 of FIG. 13, may be made by correspondingly shaped protuberances on anvil wheel 76. The embossments provided by the ultrasonic sewing method are commonly called stitch patterns. Embossment 22 is known as a single stitch pattern, and embossment 24 is known as a slant stitch pattern.

Referring now to FIG. 15, a partially schematic view of the pouch of FIG. 1 is illustrated, the pouch being partially opened. A sanitary napkin designated as 90 includes a pressure sensitive adhesive coating on its underside, the adhesive coating designated as 92. It is seen that adhesive coating 92 contacts silicone coated surface 16 of the pouch. FIG. 16 is a cross-sectional view and further illustrates the sanitary napkin having adhesive thereon and located within the pouch.

The following silicone-coated materials were employed in this invention:

Film-based materials:
A. 2.0 mil high-density polyethylene film silicone coated on one side
B. 2.5 mil low-density polyethylene film silicone coated on one side
C. 1.6 mil coextruded film silicone coated on one side
D. 1.0 mil polyester (PET) film silicone coated on one side
E. 2.0 mil polyester (PET) film silicone coated on one side paper-based materials:
F. 40 lb. (basis weight*) bleached machine glazed paper, with a basecoat of 0.85 mil of high-density polyethylene on one side with a silicone coating applied over the polyethylene
G. 20 lb. (basis weight,) bleached machine glazed paper, with a basecoat of 0.35 mil of low-density polyethylene on one side, with a silicone coating applied over the polyethylene
H. 35 lb. (basis weight,) unbleached machine glazed paper, with basecoats of 0.75 mil of high-density polyethylene on each side, with silicone coatings applied over both polyethylene coatings
I. 25 lb. (basis weight*) semi-bleached machine glazed paper, with a basecoat of polyvinyl alcohol (PVA) on one side, with a silicone coating applied over the PVA

* Basis weight is the weight of paper in 3000 sq. ft.

Heat Sealing—Equipment and Process Variables

Heat sealing tests were run on the silicone-coated materials of this study using a variety of devices to provide simultaneous embossing and heating. Four types of embossing devices were used:

1. Single embossing plates such as shown in FIGS. 7, 8, and 9 were used for one-sided embossing. For each test, an embossing plate was placed on the bottom bar of a hot bar heat sealing machine. Samples were sealed between the plate and the top bar at a specific temperature and pressure, with a short, controlled contact time. The top bar had a Teflon/fiberglass cover to prevent samples from sticking to the hot metal surface. Six embossing plates of the types shown in FIGS. 7, 8, and 9 were used in these tests. The identifications of these plates and details of the embossing patterns are as follows:

Plate Q3809
 dot pattern as shown in FIG. 7
 spacing between dots =0.0625 inch
 dot diameter at top = about 0.01 inch
 relief (top of dot to base) = about 0.04 inch Plate Q3832-1
 dot pattern as shown in FIG. 7
 spacing between dots =0.0625 inch
 dot diameter at top = about 0.01 inch
 relief (top of dot to base) = about 0.08 inch Plate Q3832-2
 dot pattern with wider spacing than Q3809 and Q3832-1
 spacing between dots =0.125 inch
 dot diameter at top = about 0.008 inch
 relief (top of dot to base) = about 0.04 inch Plate Q3833-3
 parallel line pattern as shown in FIGS. 8 and 9
 spacing between lines =0.0625 inch
 line width at top = about 0.016 inch
 relief (top of line to base) = about 0.04 inch Plate Q3834-5
 criss-crossed line pattern as shown in FIG. 10
 spacing between lines =0.0625 inch
 line width at top = about 0.016 inch
 relief (top of line to base) = about 0.04 inch Plate Q3834-6
 criss-crossed line pattern as shown in
FIG. 10
 spacing between lines =0.125 inch
 line width at top = about 0.016 inch
 relief (top of line to base) = about 0.04 inch 2. A second method of one-sided embossing has been described earlier and is shown in FIG. 11. This method used a single embossing plate and a rubber pad as a striking surface, both mounted in a flexible metal carrier which fit between the bars of the heat sealing machine. Samples were sealed between the plate and the rubber pad at a specific temperature and pressure, with a short, controlled contact time.

3. Mating embossing plates were used for two-sided embossing. Identical plates such as shown in FIGS. 7 and 8 were mounted on a flexible metal carrier which held the plates in position between the top and bottom bars of the heat sealing machine. Samples were sealed between the heated plates at a specific temperature and pressure, with a short, controlled contact time. Two sets of mating embossing plates were used in these tests: a pair of dot pattern embossing plates Q3832-1, and a pair of parallel line pattern embossing plates Q3833-3.

4. Pairs of heated metal embossing bars as described earlier and shown in FIG. 6 were used as a second means of two-sided embossing. Three pairs of heated metal embossing bars with different sizes of teeth were used in these tests. The identifications of these pairs of bars and details on the tooth patterns are as follows:

Embossing bars AG-3
 teeth spaced at about 0.049 inch
 tooth depth about 0.036 inch Embossing bars AG-140
 teeth spaced at about 0.039 inch
 tooth depth about 0.030 inch Embossing bars AG-160
 teeth spaced at about 0.026 inch
 tooth depth about 0.020 inch The ranges for the heating sealing process variables in this study were as follows:

A. The range of sealing temperatures was 115°–395° F.
B. The sealing pressure was controlled via the air line pressure to the heat sealing machine. Sealing pressures, based on the total force and the contact area of the embossing plates or bars, ranged from 65 to 2200 psi.

C. Contact time was varied from 0.25 to 5 seconds.

Ultrasonic Sewing—Equipment and Process Variables

Ultrasonic sewing tests were run on silicone-coated materials using a Model F-90 ultrasonic sewing machine manufactured by Chase Machine Company of West Warwick, R.I. and Branson Sonic Power Company of Danbury, Conn. The functional components of an ultrasonic sewing machine have been described earlier and are shown in FIG. 12. The ultrasonic sewing machine employed in this invention was powered by a Branson 900B, Model 910 BC power supply. The variables in the ultrasonic sewing process and the ranges for each in this study were as follows:

Power setting on power unit—45 to 100%.

Peripheral speed of anvil wheel was generally held constant at about 5 feet per minute.

Wheel force—1 to 9 lb.

Stitch pattern—see below

The anvil wheel of the Model F-90 ultrasonic sewing machine can be easily changed to provide different stitch patterns. Seven different wheels, all 2½ inches in diameter and of varying widths up to ⅜ inch, were used in this study. These wheels are standard items available from Branson Sonic Power Company and are listed in Tables IV and VI with Branson part numbers.

The preparation of ultrasonically sewn samples of the various materials of this study consisted of simply setting the controls on the machine to provide specific levels of ultrasonic power, wheel speed, and wheel force; and then running the samples between the ultrasonic horn and the anvil wheel.

Sample Configurations and Evaluation

Most of the tests done for this study were done with the materials folded in the trifold configuration shown in FIGS. 1 and 2, so each test involved seals with two combinations of surfaces: first the seal of the silicone-coated surface to itself, and second the seal of the silicone-coated surface to the opposite surface. The first seal corresponds to the primary seals joining the internal surfaces of a trifold pouch and the second seal corresponds to the relatively short areas where the overlap is secured along the edges of the pouch, shown as zone 20 in FIG. 2. The evaluation of sealed samples consisted of pulling the samples apart to determine the character of the seals. In the course of this work the following system of notations has been developed to designate the two types of seals in a trifold pouch configuration and to describe seal quality:

1:1 Seal=The seal formed between the inner surfaces of the trifold configuration.

1:2 Seal=The seal formed between the inner and outer surfaces of the trifold configuration.

P=Peelable seal; materials are bonded but can be pulled apart without tearing

T=Tearing seal; materials are bonded and cannot be pulled apart without tearing

N=No seal

EXAMPLES 1–29

Tables I, II, and III present the results for 29 separate heat sealing tests with 4 of the materials of this study (B, C, F, and G) using the various embossing methods that have already been described. These heat sealing tests demonstrate the versatility the method that combines heat sealing with mechanical deformation of the material for the sealing of seams in pouches made from silicone coated papers and films. Variations in the embossing pattern, the type of embossing device, and the temperature, pressure and contact time allow the method to be adapted to a diversity of materials. Examples 1 and 23 show the formation of peelable seals in both parts of a trifold pouch configuration, that is the 1:1 seal and the 1:2 seal, with material B, silicone-coated low density polyethylene film. It is possible, by controlling the process variables to determine the character of the seals formed with a given material. For example, with material C, a silicone-coated coextruded film, in Examples 2, 3, 4, 16 and 24 both the 1:1 seal and the 1:2 seal are peelable seals. However, in Examples 5, 6, and 7, again with material C, neither seal is peelable and the pouch can be opened only be tearing the material. Further, in examples 25, 26, and 27 the 1:2 seals formed with material C are peelable, but the 1:1 seals can be opened only by tearing the material. The versatility of this method for forming seals with silicone-coated materials is also evident in the results for the paper-based materials F and G both of which have the silicone coating applied over a polyethylene basecoat. In Examples 8 through 15, 28 and 29, the 1:1 seals of a trifold pouch configuration are formed with materials F and G, but no 1:2 seal is obtained with the embossing devices and the process parameters of these examples. However, in Examples 17 through 22, both 1:1 and 1:2 seals are formed with paper-based materials F and G.

TABLE I

Heat Sealing of Silicone-Coated Materials Using Single Embossing Plates

| Example | Material | Embossing Device | Temperature (°F.) | Pressure (psi) | Contact Time seconds | Results 1:1 Seal | 1:2 Seal |
| --- | --- | --- | --- | --- | --- | --- | --- |
| | | Single Embossing Plates | | | | | |
| 1 | B | Q3832-1 | 260 | 300 | 0.25 | P | P |
| 2 | C | Q3809 | 260 | 300 | 0.25 | P | P |
| 3 | C | Q3832-1 | 265 | 300 | 0.25 | P | P |
| 4 | C | Q3832-2 | 265 | 300 | 0.25 | P | P |
| 5 | C | Q3833-3 | 270 | 300 | 0.25 | T | T |
| 6 | C | Q3834-5 | 270 | 300 | 0.25 | T | T |
| 7 | C | Q3834-6 | 260 | 300 | 0.25 | T | T |
| 8 | F | Q3809 | 395 | 300 | 0.5 | P | N |

TABLE I-continued

Heat Sealing of Silicone-Coated Materials Using Single Embossing Plates

| Example | Material | Embossing Device | Temperature (°F.) | Pressure (psi) | Contact Time seconds | Results 1:1 Seal | 1:2 Seal |
|---|---|---|---|---|---|---|---|
| 9 | F | Q3809 | 390 | 450 | 0.25 | P | N |
| 10 | F | Q3832-1 | 300 | 300 | 1.0 | P | N |
| 11 | F | Q3834-5 | 395 | 300 | 0.25 | P | N |
| 12 | G | Q3809 | 330 | 300 | 0.25 | P | N |
| 13 | G | Q3832-1 | 325 | 450 | 0.25 | P | N |
| 14 | G | Q3833-3 | 390 | 300 | 0.25 | T | N |
| 15 | G | Q3834-5 | 390 | 300 | 0.25 | P | N |

TABLE II

Heat Sealing of Silicone-Coated Materials Using Mating Embossing Plates or Single Embossing Plate With Rubber Pad

| Example | Material | Embossing Device | Temperature (°F.) | Pressure (psi) | Contact Time seconds | Results 1:1 Seal | 1:2 Seal |
|---|---|---|---|---|---|---|---|
| | | Mating Embossing Plates | | | | | |
| 16 | C | Q3832-1 | 115 | 100 | 0.25 | P | P |
| 17 | G | Q3832-1 | 260 | 100 | 0.25 | T | T |
| 18 | G | Q3832-1 | 260 | 76 | 0.25 | T | T |
| 19 | G | Q3832-1 | 295 | 65 | 0.25 | T | T |
| 20 | G | Q3833-3 | 245 | 100 | 0.25 | T | T |
| | | Single Embossing Plate With Rubber Pad | | | | | |
| 21 | F | Q3832-1 with ⅛ in. thick rubber pad | 340 | 150 | 0.25 | T | P |
| 22 | G | Q3832-1 with ⅛ in. thick rubber pad | 225 | 150 | 0.25 | T | P |

TABLE III

Heat Sealing of Silicone-Coated Materials Using Metal Embossing Bars

| Example | Material | Embossing Device | Temperature (°F.) | Pressure (psi) | Contact Time seconds | Results 1:1 Seal | 1:2 Seal |
|---|---|---|---|---|---|---|---|
| | | Metal Embossing Bars | | | | | |
| 23 | B | AG-3 | 125 | 700 | 0.25 | P | P |
| 24 | C | AG-3 | 120 | 700 | 0.25 | P | P |
| 25 | C | AG-3 | 205 | 700 | 0.25 | T | P |
| 26 | C | AG-140 | 205 | 1300 | 0.25 | T | P |
| 27 | C | AG-160 | 210 | 2200 | 0.25 | T | P |
| 28 | F | AG-140 | 300 | 700 | 0.25 | P | N |
| 29 | G | AG-160 | 255 | 2200 | 0.25 | P + some T | N |

EXAMPLES 30–41

Table IV presents the results for 12 separate ultrasonic sewing tests with 6 of the materials of this study (B, C, D, F, G, and I) using 7 different anvil wheel patterns. These ultrasonic sewing tests demonstrate that this method that combines the effects of ultrasonic vibrational energy with mechanical deformation of the material is suitable for the sealing of the seams in trifold pouch configurations made with a variety of paper-based and film-based silicone coated materials. Variations in the stitching pattern provided by the anvil wheel and adjustments in the other variables of the sewing process make it possible to adapt the method to the different sealing characteristics of materials B, C, D, F, G, and I. Also, the method permits control of the strength of the seal formed with a given material, as seen in Examples 30 through 36 for the film-based materials B, C, and D. The capability of this method to control the strength of the seals formed in trifold pouch configurations is also seen in Examples 37, 38, and 39 for the paper-based materials F and G. The results for material I in Examples 40 and 41 are especially noteworthy because this paper-based material does not include any thermoplastic component. Material I has the silicone coating applied over a polyvinyl alcohol coating which is not thermoplastic and consequently would generally not be considered to be a sealable coating even if the silicone coating were not present. Nonetheless, peelable seals were formed with material I, both the 1:1 and 1:2 seals of a trifold pouch configuration, as seen in Examples 40 and 41.

increased to 5 seconds. Otherwise the procedure was the same as for Examples 1–29. The results of these 5 second sealing tests are presented in Table V. Example 42 demonstrates that this method of heat sealing using a simple dot pattern embossing plate will provide peelable seals with a silicone coated high density polyethylene film material A. Examples 43 and 44 with silicone-coated polyester films, materials D and E, show that these materials are not sealable by this particular method. Example 45, shows that strong seals which can be opened only by tearing the material can be formed with material H by this method. Material H differs from the other materia in this study in that it has a silicone coating on both sides, with polyethylene coatings applied on both sides of the paper as basecoats for the silicone coatings. The test of Example 45 involved only one side of material H. Example 46, with material I, like the earlier Example 40 and 41, demonstrates that a silicone coated paper-based material with a nonthermoplastic polyvinyl alcohol basecoat

TABLE IV

Ultrasonic Sewing of Silicone-Coated Materials

| Example | Material | Anvil Wheel Pattern | Wheel Force (lb.) | Speed (fpm) | Power setting | Results 1:1 Seal | 1:2 Seal |
|---|---|---|---|---|---|---|---|
| 30 | B | Leaf Pattern 101-160-940 | 1 | 5 | 100% | T | T |
| 31 | B | Medium Male Knurled Pattern 101-160-968 | 1 | 5 | 75% | P | P |
| 32 | C | Flower Pattern 101-160-939 | 2 | 5 | 100% | T | T |
| 33 | C | Left Slant Stitch 101-160-951 | 1 | 5 | 100% | P | P |
| 34 | C | Dot Stitch Pattern 022 | 2 | 5 | 45% | P | P |
| 35 | D | Single Stitch Pattern 101-160-911 | 9 | 5 | 100% | T | T |
| 36 | D | Medium Male Knurled Pattern 101-160-968 | 1 | 5 | 100% | P | P |
| 37 | F | Medium Male Knurled Pattern 101-160-968 | 7 | 5 | 100% | P | N |
| 38 | F | Zigzag, Split Pattern 101-160-925 | 9 | 5 | 100% | T | P |
| 39 | G | Dot Stitch Pattern 022 | 9 | 5 | 50% | P | P |
| 40 | I | Single Stitch Pattern 101-160-911 | 7 | 5 | 100% | P | P |
| 41 | I | Dot Stitch Pattern 022 | 9 | 5 | 50% | P | P |

EXAMPLES 42–46

Heat sealing tests were conducted on materials A, D, E, H, and I to determine whether the primary seal (1:1) of a trifold construction or the two ply seal of pouch 10 shown in FIG. 3 could be made using a single embossing plate, specifically embossing plate Q3809. For these tests the contact time was under the silicone can be sealed by a method that combines a localized, concentrated impingement of energy upon the material with mechanical deformation of the material, in this case forming a weak peelable seal.

TABLE V

Heat Sealing of Silicone-Coated Materials Using A Single Embossing Plate

| Example | Material | Embossing Device | Temperature (°F.) | Pressure (psi) | Contact Time seconds | Results 1:1 Seal | 1:2 Seal |
|---|---|---|---|---|---|---|---|
| | | Single Embossing Plates | | | | | |
| 42 | A | Q3809 | 300 | 300 | 5 | P | Not Tested |
| 43 | D | Q3809 | 400 | 300 | 5 | N | Not Tested |
| 44 | E | Q3809 | 400 | 300 | 5 | N | Not Tested |
| 45 | H | Q3809 | 300 | 300 | 5 | T | Not Tested |
| 46 | I | Q3809 | 400 | 300 | 5 | P (weak) | Not Tested |

EXAMPLES 47–49

Ultrasonic sewing tests were conducted on materials A, E, and H to determine whether the primary seal of a trifold configuration or the two ply seal of pouch 10 shown in FIG. 3 could be made using the standard single stitch pattern. For these tests the upward force on the anvil wheel was not determined and the speed was varied over a range of 5–10 feet per minute. Otherwise the procedure was the same as for Examples 30–41. The results of these tests on materials A, E, and H are presented in Table VI. Example 47, with silicone coated high density polyethylene film, material A, demonstrates that the ultrasonic sewing method can be used to form tight, material-tearing seals with this type of material. Example 48 is in agreement with Example 35 which also shows that strong, nonpeelable seals can be formed with a silicone coated polyester film by ultrasonic sewing with a single stitch pattern. Example 49 shows peelable seals formed by ultrasonic sewing with paper-based material H which has silicone applied over polyethylene on both sides.

TABLE VI

Ultrasonic Sewing of Silicone-Coated Materials

| Example | Material | Anvil Wheel Pattern | Wheel Force (lb.) | Speed (fpm) | Power setting | Results 1:1 Seal | 1:2 Seal |
|---|---|---|---|---|---|---|---|
| 47 | A | Single Stitch Pattern 101-160-911 | — | 5–10 | 100% | T | Not Tested |
| 48 | E | Single Stitch Pattern 101-160-911 | — | 5–10 | 100% | T | Not Tested |
| 49 | H | Single Stitch Pattern 101-160-911 | — | 5–10 | 100% | P | Not Tested |

EXAMPLES 50–57

For comparison with the results of Examples 1–49, standard hot bar heat sealing tests were conducted with materials A through F, H and I. These tests included only the evaluation of the sealability of the silicone-coated side of the material to itself, i.e. the primary seal in a trifold configuration. These tests were conducted with a standard hot bar heat sealing machine with two flat bars both covered with Teflon-coated glass fabric to prevent the samples from sticking to the hot bars. In an attempt to form seals via this method the temperature was progressively increased for each material to at least 350° F. With some of the film-based materials it was not possible to extend the test to 350° F. because the films were completely melted at lower temperatures. The results of these tests are presented in Table VII. None of the materials showed any degree of sealability using the standard hot bar sealing method. These results are not surprising since it is well known that silicone coated papers and films are not sealable by the methods of the prior art. The categorical difference between the results of the tests of Examples 50–57 and the results of the earlier examples confirms that the present invention is a total departure from the prior art concerning pouches made from silicone coated materials.

TABLE VII

Attempted Heat Sealing of Silicone-Coated Materials By Standard Hot Bar Heat Sealing

| Example | Material | Embossing Device | Temperature (°F.) | Pressure (psi) | Contact Time Seconds | Results 1:1 Seal | 1:2 Seal |
|---|---|---|---|---|---|---|---|
| 50 | A | None | 350 | 75 | 5 | N | Not Tested |
| 51 | B | None | 300 | 75 | 5 | N | Not Tested |
| 52 | C | None | 300 | 75 | 5 | N | Not Tested |
| 53 | D | None | 400 | 75 | 5 | N | Not Tested |
| 54 | E | None | 400 | 75 | 5 | N | Not Tested |
| 55 | F | None | 350 | 75 | 5 | N | Not Tested |
| 56 | H | None | 400 | 75 | 5 | N | Not Tested |
| 57 | I | None | 400 | 75 | 5 | N | Not Tested |

The examples that have been presented show that the method of this invention for sealing the seams in pouches made from silicone coated papers and films has a high degree of versatility in terms of the composition of the pouch materials. A wide-variety of silicone coated materials of other compositions different than those that have been discussed could be used to form pouches by the methods of this invention. It is to be understood that the scope of this invention is not limited to the materials used in the examples. Other materials to which the methods of this invention may be applied to form pouches will be obvious to those skilled in the art of flexible packaging materials. Examples of possible alternative silicone coated paper-based materials include the following: silicone-coated papers comprised of thermoplastic fibers such as polyethylene fibers, silicone-coated papers with the silicone coating applied over a polyester (PET) basecoat, silicone-coated papers with the silicone coating applied to a film such as a polypropylene film laminated to the paper, and silicone coated papers with the silicone coating applied on one side of a paper having a basecoat such as polyethylene on both sides. Examples of alternative film-based materials that could be used in the practice of this invention include the following: silicone coated polypropylene film, silicone coated nylon film, and silicone coated water soluble films such as poly(ethylene oxide) film. Other flexible materials related to papers and films may be used as the basestocks to which silicone coatings are applied to provide sheets for forming pouches by the methods of this invention, including but not limited to woven and nonwoven fabrics, thin sheets of flexible plastic foam, cellophane and aluminum foil, any of which may include a coating or lamination applied to the sheet prior to silicone coating to provide a smooth base for the silicone coating.

Although this invention is particularly concerned with pouches made from materials having silicone coatings that cover the full area of the inward facing surface, it may be desirable in some cases to use materials that have only partial coverage of the inward facing surface by the silicone coating. For example, to provide selective adherence of the contained product to some portion of the pouch material, the silicone coating may be omitted from predetermined areas of the material. Also, it may be preferable in some cases to have a nonpeelable seal in a specific seam area of a pouch that otherwise has peelable seals. This could be accomplished by providing a silicone-free area for the nonpeelable seal.

Of course the possible applications of the concepts of this invention are not limited to specific pouch designs. In addition to the designs shown in FIG. 1 and 3, pouches of other designs may be formed from flexible silicone coated materials in the manner provided by this invention. For example, pouches of nonrectangular shape, pouches with seams that are not coincident with the edges of the pouch, and pouches with more than one separate internal space for the product are all within the scope of this invention. More generally, all designs of packages formed from flexible silicone coated materials that might be classified as pouches, bags, envelopes, or similar containers are within the province of this invention.

The examples that have been presented show that a diversity of devices and apparatus can be used to practice the method of this invention to seal the seams of pouches made from silicone coated sheet materials, wherein the silicone coating is on an inside surface of the pouch. However, it is to be understood that the specific devices and apparatus described thus far are only examples of a far broader range of possibilities. Many other means of providing the essential features of the sealing method of this invention will be apparent to those skilled in the art of sealing plastic films, coated papers and related materials. For example, instead of the embossing device utilizing heated metal bars with mating teeth, as shown in FIG. 6, one could use a pair of mating, rotating, heated gear wheels to provide a continuous sealing apparatus suitable for high speed production. Conversely, instead of the dynamic ultrasonic sewing process of FIG. 17, one could use a simple reciprocating ultrasonic sealing machine which would have one or more stationary anvils, each with a reciprocating ultrasonic horn, with each anvil/horn combination sized to provide the seal along one edge of a pouch.

The sealing method of this invention requires the simultaneous effects of energy absorption by the silicone-coated material being sealed and mechanical deformation of the material. In the examples that have been presented, two methods of delivering energy to the seal area have been used, direct heating and the impinging of ultrasonic vibrational energy upon the material. Other means of providing the energy component of the sealing process are within the scope of this invention. For example, with silicone coated sheets based on materials that are responsive to induction heating, the sealing process could be based on the combination of induction heating and embossing. Similarly, with materials that are responsive to radio frequency sealing, the sealing process could use this mode of energy input, again combined with mechanical deformation of the material.

The method that has been described by way of examples and explanatory material for sealing the seams in pouches made from silicone-coated materials provides a means for producing pouches and similar packages of a form not previously possible. The essential difference between the pouches of the current invention and those of the prior art is that it is now possible to produce pouches with silicone coatings covering one or more internal surfaces of the pouch with the silicone coating extending into the seam areas of the pouch. Thus it is not necessary to follow the practice of the prior art wherein silicone coatings were applied to pouch materials in zones so as to leave uncoated areas that could be heat sealed.

Examples 1–49 illustrate the utility of the method of this invention for sealing the seams of pouches made from silicone coated materials, including papers with polyethylene coatings that were applied to the paper via conventional extrusion coating methods to provide smooth basecoats, over which the silicone coatings were applied. These papers have been identified previously as materials F, G and H. As an alternative to papers of this type, it is possible to produce silicone coated papers which include thermoplastic polymers in forms other than extrusion coatings. Specifically, water-based emulsions or dispersions of thermoplastic polymers can be used to provide silicone coated papers with thermoplastic components in any of the following forms:

(1) a thermoplastic basecoat applied on one surface of the paper as a water-based dispersion or emulsion prior to the application of the silicone coating.

(2) an admixed thermoplastic polymer included in the silicone coating formulation as a water-based dispersion or emulsion.

(3) a thermoplastic coating applied on the surface of the paper opposite the silicone coating as a water-based emulsion or dispersion.

Silicone coated papers containing thermoplastic polymers in any of the forms just described are suitable for the formation of flexible containers, such as pouches, bags or envelopes, with silicone coated inner surfaces and edge seams formed by sealing together plies of material with inward facing silicone coated surfaces. In fact, the use of water-based emulsions or dispersions of thermoplastic polymers has certain important advantages over the use of thermoplastic polymers applied as extrusion coatings. First, the sealing characteristics of silicone coated papers containing thermoplastic polymers in forms (1), (2), and/or (3) are, in many cases, superior to those of silicone coated papers with extrusion coated thermoplastic basecoats. With the latter materials, it has generally not been possible to obtain peelable seals for both the 1:1 seals and 1:2 seals in a trifold pouch configuration. When the method of this invention that subjects the materials to simultaneous heating and embossing effects is used, the best results obtained with materials F, G and H are either the combination of a peelable 1:1 seal with no 1:2 seal, or the combination of a destructive 1:1 seal with a peelable 1:2 seal. The generally preferred result of both seals being peelable can be seen in examples 58, 60, 62, 66–69 and 71.

A second advantage of using water-based emulsions or dispersions as the means of including thermoplastic polymers in silicone coated papers relates to the ease of manufacture of the coated paper product. When extrusion coated thermoplastic basecoats are used, a separate machine and a separate processing step are required to apply to the basecoat. In contrast, any of the options (1), (2), and/or (3) can generally be produced using the same type of coating equipment that the manufacturer uses to apply silicone coatings. In some cases, the complete product can be produced in a single pass through a machine designed to handle water-based coatings.

A third advantage of using water-based emulsions or dispersions of the thermoplastic polymers, as opposed to extrusion coated polymers, becomes apparent when one compares the coating weights of the thermoplastic basecoats in some of the examples that follow with the coating weights of the polyethylene extrusion coatings used in materials F, G and H. The thermoplastic basecoats applied as water-based emulsions or dispersions have coating weights in the range of 2.5 to 8 pounds per 3000 ft. sq., and generally 4 pounds per 3000 sq. ft. or less. The polyethylene coating weights for materials F, G and H are, respectively, 13, 5, and 11.5 lb. per 3000 sq. ft. The lighter coatings produced from polymer emulsions will generally be less expensive than extruded polyethylene coatings. Further, the lighter coating weights are advantageous because the stiffness of a coated paper product is affected by the thickness of the coatings, and the lower stiffness of the materials with lighter coatings makes it possible to produce pouches that are softer and more pliable with less of a tendency to rattle, especially when the lighter coatings are used on light weight papers. The characteristics just mentioned are important in packages for disposable consumer products that the consumer may wish to use discretely.

Another category of advantages of using thermoplastic polymers in the form of water-based emulsions or dispersions is based on environmental factors. A paper-based product is generally viewed as being more suitable for recycling or disposal in a landfill than a plastic film product, but this perceived advantage is lost, from the point of view of the consumer, when the paper has a polyethylene coating. There will generally be a higher level of consumer acceptance for a paper product that involves only water-based coatings than for products with extruded thermoplastic coatings such as polyethylene. Of course, the lower coating weights that were found to provide functional levels of sealability with water-based thermoplastic coatings are consistent with the view that silicone coated papers incorporating such coatings may be more readily recycled or may breakdown more readily in a landfill than materials with extruded thermoplastic coatings. Another aspect of the overall environmental impact of a silicone coated paper product concerns the use of organic solvents during the manufacturing process. Water-based emulsions and dispersions of thermoplastic polymers emit no organic solvent vapors, and they can be used in combination with water-based silicone coatings or 100% solids silicone coatings to achieve and maintain compliance with environmental regulations.

The prior art includes examples of silicone coated papers where thermoplastic polymers provided in the form of water-based emulsions or dispersions are included as either basecoats, components of the silicone coatings, or coatings on the opposite side of the paper. However, the prior art does not recognize that such materials can be used to form pouches, particularly pouches with sealed edges of the type discussed in the present disclosure. U.S. Pat. No. 4,533,600 discloses a silicone coated paper with a coating of a resin composition produced from a rubber-modified polyvinyl chloride emulsion, applied to the paper before the silicone coating. The product also has the resin coating on the side of the paper opposite the silicone coating. The resulting coated paper product is intended for use as a substrate on which sealants or adhesives can be cast. U.S. Pat. No. 4,454,266 discloses a silicone coated paper wherein an emulsion of an acrylic terpolymer is added to the silicone coating. The resulting product is used for the manufacture of rolled pressure sensitive label transfer tapes. The function of the acrylic terpolymer is to modify the release characteristics of the silicone coating. It is also known that silicone coated papers with emulsions of ethylene vinyl acetate copolymers added to the silicone coatings have been manufactured with the purpose of providing a product with release characteristics suitable for specific applications. Although the prior art includes certain silicone coated papers that include thermoplastic coatings provided as water-based emulsions, and other silicone coated papers where emulsions of thermoplastic polymers have been added to the silicone coatings, the prior art provides no example or suggestion of the use of such materials in pouches or similar packages. Also, the prior art does not recognize the potential for producing sealed seams in a package formed from such materials, where the internal surfaces of the package that extend into the seal areas are silicone coated.

Examples 58 through 72 show that pouches with sealed edge seams can be produced from a variety of silicone coated papers wherein thermoplastic polymers are included in any of the forms (1), (2), and/or (3) described earlier.

In Examples 58 to 72, sealing tests were run using the method described earlier as the second method under the heading Heat Sealing—Equipment and Process Variables. In all cases, for Examples 58 through 72, the embossing plate had the same embossing pattern of small, closely-spaced dots as plate Q3832-1, also described earlier. Samples were sealed between the embossing plate and a ⅛" thick rubber pad with heat transmitted to both the plate and rubber pad from the bars of a standard hot bar heat sealing machine as shown in FIG. 11. A slightly modified version of plate Q3832-1, designated Q3832-1M has the same embossing pattern with the same size dots, but with a narrower seal width of 0.375 inch, versus the 0.625 inch seal width provided by plate Q3832-1. Tests were run at various sealing temperatures and embossing pressures, and with short, controlled contact times in the range of 0.25 second to 5 seconds. In all cases, samples were sealed in the trifold configuration described earlier and shown in FIGS. 1 and 2. As before, the evaluation of seal quality consisted of pulling the samples apart to determine the strength of the seal formed between the inner surfaces of the trifold configuration (the 1:1 seal) and the strength of the seal formed between the inner and outer surfaces of the trifold configuration (the 1:2 seal). For Examples 58 through 72, the following system was used for the rating of seal strengths:

0=No seal.

1=Virtually no seal, the seams of the pouch will not withstand even light handling.

2=Intermediate level of seal quality.

3=Intermediate level of seal quality.

4=Intermediate level of seal quality.

5=Weak seal, suitable for pouches that are not subjected to rough handling.

6=Intermediate level of seal quality.

7=Intermediate level of seal quality.

8=Intermediate level of seal quality.

9=Peelable seal of sufficient strength to remain closed if a pouch is subject to rough handling.

10=Peelable seal of sufficient strength to remain closed if a pouch is subjected to rough handling.

D=Destructive seal, cannot be opened without tearing the paper.

The results of the sealing tests for Examples 58 to 72 are summarized in Table VIII. In some cases, the best result for a particular pouch material may involve a destructive seal, for either the 1:1 seal, or the 1:2 seal, or both. Although it is generally preferable that both seals be peelable, destructive seals provide a tamper-evident feature that is important in some packaging applications. A special situation is discussed in example 65, concerning pouch materials that provide a destructive 1:1 seal in combination with a very weak 1:2 seal. Another special situation is discussed in example 70, concerning pouch materials that provide a peelable 1:2 seal in combination with a zero strength 1:1 seal.

The release characteristics of the silicone coated papers of examples 58 through 72 were evaluated by a method published by the Technical Association of the Pulp and Paper Industry, designated Tappi UM 502. The results of the release characterization tests are reported in Table VIII.

EXAMPLE 58

A bleached machine glazed (MG) paper with a basis weight of 25 lb. per 3000 ft. provided by MoDo Cellkraft, Sweden, was first coated on the MG surface (the first surface) with a water-based emulsion of an ethylene vinyl acetate copolymer. The ethylene vinyl acetate copolymer emulsion, namely Airflex 110, was supplied by Air Products of Allentown, Pa. This emulsion, as supplied, contains about 55% by weight of an ethylene vinyl acetate copolymer with a glass transition temperature of 4° C. The Airflex 110 emulsion was diluted with water to reduce the solids content (primarily EVA copolymer) to about 20% by weight and the diluted material was applied to the paper with a wire wound coating rod providing a wet coating weight of about 20 lbs. per 3000 sq. ft. The coating was dried in a forced air oven with an air temperature of about 280° F., resulting in a dry coating weight of about 4 lb. per 3000 sq. ft. The preceeding steps provided a thermoplastic basecoat on one surface (the first surface) of the paper. Next a silicone polymer coating was applied over the thermoplastic basecoat. The silicone polymer coating formulation was a 100% solids formulation of the following composition:

183.4 grams SL 5000

16.6 grams SL 5010

0.4 grams SL 5040

8.0 grams SS 4300c

SL 5000 is a solventless silicone polymer resin, SL 5010 is solventless Platinum catalyst concentrate, SL 5040 is an inhibitor, and SS 4300c is a cross-linker. All of these ingredients were supplied by General Electric of Waterford, N.Y. The silicone polymer coating formulation, containing 100% total solids, was applied over the thermoplastic basecoat with a three roll offset coating method providing a wet and dry coating weight of about 0.6 lb. per 3000 sq. ft. The silicone polymer coating was cured in a forced air oven with an air temperature of about 450° F.

The coated product of this example was a silicone polymer coated paper with thermoplastic basecoat. The thermoplastic polymer of the basecoat will be referred to herein as a first film-forming thermoplastic polymer to distinguish it from thermoplastic polymers used in other ways in other examples. This general description of the product of this example also applies to the silicone polymer coated papers of examples 59 through 64.

Figure 19:
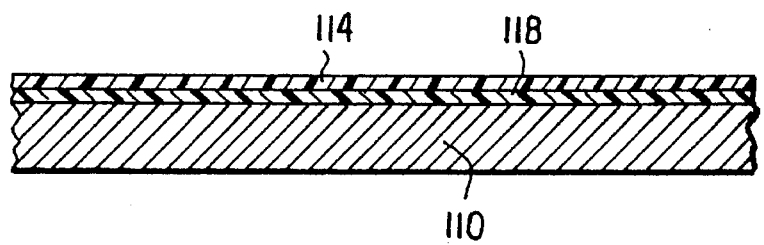
FIG. 19 is a sectional view of an alternate type of sheet material used to form the pouch of this invention.

The results of tests to evaluate the material of this example as a pouch material are presented in Table VIII. FIG. 19 illustrates the material of this Example, which can be used to make pouches of the type shown in FIGS. 1, 2, and 3. In FIG. 19, the paper substrate of the silicone polymer coated paper is designated as 110, the silicone polymer coating is designated as 114, and the thermoplastic basecoat is designated as 118. FIG. 19 also illustrates the method of Examples 59 through 64.

EXAMPLE 59

A bleached machine glazed (MG) paper with a basis weight of 25 lb. per 3000 sq. ft. provided by MoDo Cellkraft, Sweden, was first coated on the MG surface (the first surface) with Airflex 110, an ethylene vinyl acetate copolymer emulsion as described in example 1, to provide thermoplastic basecoat having a dry coating weight of about 4 lb. per 3000 sq. ft. Next, a silicone polymer coating was applied over the thermoplastic basecoat. The silicone polymer coating was produced from a water-based coating formulation of the following composition:

184 grams PC-188

16 grams PC-95

PC 188 is a water-based silicone polymer emulsion, and PC 95 is a water-based emulsion of the catalyst for PC-188. Both ingredients are supplied by PCL of Rock Hill, S.C. The water based silicone polymer coating formulation was diluted with water to about 20% total solids and the diluted material was applied over the thermoplastic basecoat with a wire wound coating rod providing a wet coating weight of about 1.5 lb. per 3000 sq. ft. The silicone polymer coating was dried and cured in a forced air oven with an air temperature of about 280° F., resulting in a dry coating weight of about 0.3 lb. per 3000 sq. ft.

The results of tests to evaluate the material of this example as a pouch material are presented in Table VIII.

EXAMPLE 60

A bleached machine glazed (MG) paper with a basis weight of 30 lb per 3000 sq. ft. provided by Thilmany Pulp and Paper, Kaukauna, Wis., was first coated on the MG surface (the first surface) with a water-based emulsion of polyvinyl acetate. The polyvinyl acetate emulsion, namely Vinac XX220, was supplied by Air Products of Allentown, Pa. This emulsion, as supplied, contains about 55% by weight of a vinyl acetate polymer with a glass transition temperature of 35° C. The Vinac XX220 emulsion was applied to the paper without dilution with a wire wound coating rod providing a wet coating weight of about 14 lbs.

per 3000 sq. ft. The coating was dried in a forced air oven with an air temperature of about 90° C., resulting in a dry coating weight of about 8 lb. per 3000 Sq. ft. Next a silicone polymer coating was applied over the thermoplastic basecoat. The silicone polymer coating formulation was of the same composition and was applied and cured in the same manner as described in example 59. The resulting dry coat weight was about 0.6 lb. per 3000 sq. ft.

The results of tests to evaluate the material of this example as a pouch material are presented in Table VIII.

EXAMPLE 61

A bleached machine glazed (MG) paper with a basis weight of 30 lb. per 3000 sq. ft. provided by Thilmany pulp and Paper, Kaukauna, Wis., was first coated on the MG surface (the first surface) with a water-based emulsion of an ethylene vinyl chloride copolymer. The ethylene vinyl chloride copolymer emulsion, namely Airflex 4530, was supplied by Air Products of Allentown, Pa. This emulsion, as supplied, contains about 50% by weight of an ethylene vinyl chloride copolymer with a glass transition temperature of 30° C. The Airflex 4530 emulsion was applied to the paper without dilution with a wire wound coating rod providing a wet coating weight of about 6 lbs per 3000 sq. ft. The coating was dried in a forced air oven with an air temperature of about 90° C., resulting in a dry coating weight of about 3 lb. per 3000 sq. ft. Next a silicone polymer coating was applied over the thermoplastic basecoat. The silicone polymer coating formulation was of the same composition and was applied and cured in the same manner as described in example 59. The resulting dry coat weight of the silicone polymer coating was about 0.6 lb. per 3000 sq. ft.

The results of tests to evaluate the material of this example as a pouch material are presented in Table VIII.

EXAMPLE 62

A bleached machine glazed (MG) paper with a basis weight of 30 lb. per 3000 sq. ft. provided by Thilmany Pulp and Paper, Kaukauna, Wis., was first coated on the MG surface (the first surface) with a water-based emulsion of an acrylic copolymer. The acrylic copolymer emulsion, namely Hycar 26373, was supplied by B. F. Goodrich of Akron, Ohio. This emulsion, as supplied, contains about 58% by weight of an acrylic copolymer with a glass transition temperature of 5° C. The Hycar 26373 emulsion was applied to the paper without dilution with a wire wound coating rod providing a wet coating weight of about 10 lbs. per 3000 sq. ft. The coating was dried in a forced air oven at about 90° C., resulting in a dry coating weight of about 6 lb. per 3000 sq. ft. Next, a silicone polymer coating was applied over the thermoplastic basecoat. The silicone polymer coating formulation was of the same composition and was applied and cured in the same manner as described in example 59. The resulting dry coat weight of the silicone polymer coating was about 0.6 lb. per 3000 sq. ft.

The results of tests to evaluate the material of this example as a pouch material are presented in Table VIII.

EXAMPLE 63

A bleached machine glazed (MG) paper with a basis weight of 30 lb. per 3000 sq. ft. provided by Thilmany Pulp and Paper, Kaukauna, Wis., was first coated on the MG surface (the first surface) with a water-based emulsion of a vinylidene chloride copolymer. The vinylidene chloride copolymer emulsion, namely Geon 650X18, was supplied by B. F. Goodrich of Akron, Ohio. This emulsion, as supplied, contains about 55% by weight of a vinylidene chloride copolymer with a glass transition temperature of 15° C. The Geon 650X18 emulsion was applied to the paper without dilution with a wire wound coating rod providing a wet coating weight of about 6 lbs per 3000 sq. ft. The coating was dried in a forced air oven with an air temperature of about 90° C., resulting in a dry coating weight of about 3 lb. per 3000 sq. ft. Next a silicone polymer coating was applied over the thermoplastic basecoat. The silicone polymer coating formulation was of the same composition and was applied and cured in the same manner as described in example 59. The resulting dry coat weight of the silicone polymer coating was about 0.6 lb. per 3000 sq. ft.

The results of tests to evaluate the material of this example as a pouch material are presented in Table VIII.

EXAMPLE 64

A bleached machine glazed (MG) paper with a basis weight of 30 lb. per 3000 sq. ft. provided by Thilmany pulp and Paper, Kaukauna, Wis., was first coated on the MG surface (the first surface) with a water-based dispersion of polystyrene in the form of small, powder-like particles. This dispersion, namely Plastic Pigment 714A, was supplied by Dow Chemical of Midland, Md. The dispersion, as supplied, contains about 48% by weight of polystyrene particles. The Plastic Pigment 714A dispersion was applied to the paper without dilution with a wire wound coating rod providing a wet coating weight of about 5 lbs. per 3000 sq. ft. The coating was dried in a forced air oven with an air temperature of about 125° C. to fuse the polystyrene particles into a continuous coating with a dry coating weight of about 2.5 lbs. per 3000 sq. ft. Next a silicone polymer coating was applied over the thermoplastic basecoat. The silicone polymer coating formulation was of the same composition and was applied and cured in the same manner as described in example 59. The resulting dry coat weight of the silicone polymer coating was about 0.6 lb. per 3000 sq. ft.

The results of tests to evaluate the material of this example as a pouch material are presented in Table VIII.

EXAMPLE 65

A bleached machine glazed (MG) paper with a basis weight of 25 lb. per 3000 sq. ft. provided by Thilmany Pulp and Paper, Kaukauna, Wis., was coated on the MG surface (the first surface) with a silicone polymer coating formulation containing an admixed thermoplastic polymer. The silicone polymer coating formulation was a water-based formulation of the following composition:

140 grams PC-107
11.2 grams PC-95
81.5 grams Airflex 401
304.8 grams water

PC-107 is a water-based silicone polymer emulsion, and PC-95 is a water-based emulsion of the catalyst for PC-107. Both ingredients are supplied by PCL of Rock Hill, S.C. Airflex 401 is a water-based emulsion of an ethylene vinyl acetate copolymer, supplied by Air Products of Allentown, Pa. The Airflex 401 emulsion, as supplied, contains about 55% by weight of an ethylene vinyl acetate copolymer with a glass transition temperature of −15° C. The above formulation, containing about 20% total solids, was applied to the paper with a wire wound coating rod providing a wet coating weight of about 10 lb. per 3000 sq. ft. The coating was dried and cured in a forced air oven with an air temperature of about 280° F., resulting in a dry coating weight of about 2 lb. per 3000 sq. ft.

The coated product of this example was a silicone polymer coated paper with an admixed thermoplastic polymer included in the silicone coating. This general description of the product of this example also applies to the silicone polymer coated papers produced in examples 66 and 67.

The results of tests to evaluate the material of this example as a pouch material are presented in Table VIII.

Figure 20:
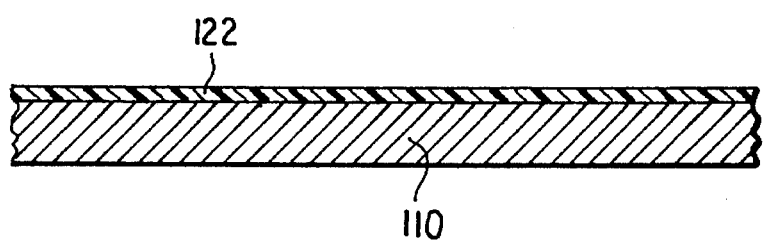
FIG. 20 is a sectional view of another alternate type of sheet material used to form the pouch of this invention.

It will be noted that the silicone polymer coated paper of this example provided the rather unique combination of a destructive 1:1 seal and a very weak 1:2 seal in a trifold configuration. This combination may be useful in some applications. The weak 1:2 seal would permit the overlapped portion of a trifold pouch, as shown in FIG. 1, to be lifted for inspection of the contents of the pouch or for insertion of instructions or other product information provided by the manufacturer of the product contained in the pouch. The destructive 1:1 seal would provide the consumer with insurance that the package had not been opened, and therefore that the product had not been used, prior to their purchase of the product. FIG. 20 illustrates the material of this Example, which can be used to make pouches of the type shown in FIGS. 1, 2, and 3. In FIG. 20, the paper substrate of the silicone polymer coated paper is designated as 110, and the silicone coating containing an admixed thermoplastic polymer is designated as 122. FIG. 20 also illustrates the material of Examples 66 and 67.

EXAMPLE 66

A bleached machine glazed (MG) paper with a basis weight of 30 lb. per 3000 sq. ft. provided by E. B. Eddy Forest Products, Ottawa, Ontario, was coated on the MG surface (the first surface) with a silicone polymer coating formulation containing an admixed thermoplastic polymer. The silicone polymer coating formulation was a water-based formulation of the following composition:

140 grams PC-188

11.2 grams PC-95

81.5 grams Airflex 401

305 grams water

The sources of commercially available materials used in the above formulation are given in previous examples. The above formulation, containing about 20% total solids, was applied to the paper with a wire wound coating rod providing a wet coating weight of about 10 lb. per 3000 sq. ft. The coating was dried and cured in a forced air oven with an air temperature of about 280° F., resulting in a dry coating weight of about 2 lb. per 3000 sq. ft.

The results of tests to evaluate the material of this example as a pouch material are presented in Table VIII.

EXAMPLE 67

A bleached machine glazed (MG) paper with a basis weight of 25 lb. per 3000 sq. ft. provided by Thilmany Pulp & Paper, Kaukauna, Wis., was coated on the MG surface (the first surface) with a silicone polymer coating formulation containing an admixed thermoplastic polymer. The silicone polymer coating formulation was a water-based formulation of the following composition:

140 grams SYL-OFF 1171

7 grams SYL-OFF 1171A 112 grams Airflex 401

416 grams water

SYL-OFF 1171 is a water-based silicone polymer emulsion and SYL-OFF 1171A is a water-based emulsion of the catalyst for SYL-OFF 1171. Both ingredients are supplied by Dow Corning Corporation of Midland, Mich. Airflex 401 is a water-based emulsion of an ethylene vinyl acetate copolymer, as described in example 65. The above formulation, containing 20% total solids, was applied to the paper with a wire wound coating rod providing a wet coating weight of about 10 lb. per 3000 sq. ft. The coating was dried and cured in a forced air oven with an air temperature of about 280° F., resulting in a dry coating weight of about 2 lb. per 3000 sq. ft.

The results of tests to evaluate the material of this example as a pouch material are presented in Table VIII.

EXAMPLE 68

A bleached machine glazed (MG) paper with a basis weight of 30 lb. per 3000 sq. ft. provided by Thilmany Pulp and Paper, Kaukauna, Wis., was coated on the MG surface (the first surface) with Airflex 401, an ethylene vinyl acetate copolymer emulsion as described in example 65 to provide a thermoplastic basecoat having a dry coating weight of about 4 lb. per 3000 sq. ft. Next a silicone polymer coating containing an admixed thermoplastic polymer was applied over the thermoplastic basecoat. The silicone polymer coating was produced from a water-based coating formulation of the following composition:

205 grams PC-107

24.6 grams PC-95

15.4 grams Airflex 401

780 grams water

The sources of commercially available materials used in the above formulation are given in example 65. The above water-based silicone polymer coating formulation, containing about 10% total solids, was applied over the thermoplastic basecoat with a wire wound coating rod providing a wet coating weight of about 4 lb. per 3000 sq. ft. The silicone polymer coating was dried and cured in a forced air oven with an air temperature of about 350° F., resulting in a dry coating weight of about 0.4 lb. per 3000 sq. ft.

The coated product of this example was a silicone polymer coated paper with a thermoplastic basecoat and with an admixed thermoplastic polymer included in the silicone polymer coating. The thermoplastic polymer of the basecoat will be referred to herein as a first film-forming thermoplastic polymer to distinguish it from thermoplastic polymers used in other ways. This general description of the product of this example also applies to the silicone polymer coated paper produced in example 69.

Figure 21:
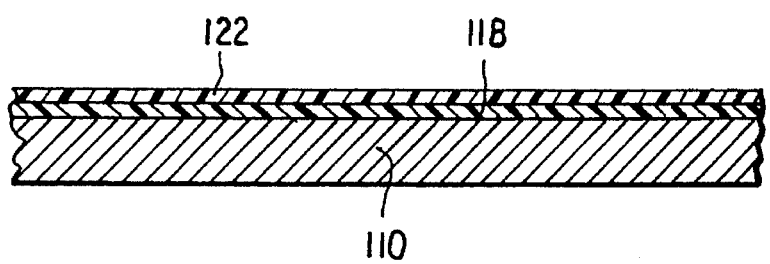
FIG. 21 is a sectional view of still another type of sheet material used to form the pouch of this invention.

The results of tests to evaluate the material of this example as a pouch material are presented in Table VIII. FIG. 21 illustrates the material of this Example, which can be used to make pouches of the type shown in FIGS. 1, 2, and 3. In FIG. 21, the paper substrate of the silicone polymer coated paper is designated as 110, the silicone polymer coating containing an admixed thermoplastic polymer is designated as 122, and the thermoplastic basecoat is designated as 118. FIG. 21 also illustrates the material of Example 69.

EXAMPLE 69

A silicone polymer coated paper with an ethylene vinyl acetate copolymer thermoplastic basecoat, and with the same ethylene vinyl acetate copolymer included in the silicone coating, was prepared from the same materials, using the same methods and with the same resulting coating weights as in example 68, but with an increased amount of ethylene vinyl acetate copolymer in the silicone polymer coating. In this case the composition of the water-based silicone polymer coating formulation was as follows:

176 grams PC-107

21.1 grams PC-95

21.1 grams Airflex 401

643.5 grams water

The results of tests to evaluate the material of this example as a pouch material are presented in Table VIII.

EXAMPLE 70

A bleached machine glazed (MG) paper with a basis weight of 25 lb. per 3000 sq. ft. provided by Thilmany Pulp and Paper, Kaukauna, Wis., was coated on the MG surface (the first surface) with a silicone polymer coating formulation of the following composition:

184 grams PC-107

16 grams PC-95

200 grams water

The sources of commercially available materials used in the above formulation are given in example 65. This water-based silicone polymer coating formulation, containing about 20% total solids was applied to the paper with a wire wound coating rod providing a wet coating weight of about 3 lb. per 3000 sq. ft. The coating was dried and cured in a forced air oven with an air temperature of about 280° F., resulting in a dry coating weight of about 0.6 lb. per 3000 sq. ft. Next, the surface of the paper opposite the silicone polymer coating (the second surface) was coated with a water-based emulsion of an ethylene vinyl acetate copolymer, namely Airflex 401, as described in example 65. The Airflex 401 emulsion was applied without dilution on the second surface of the paper with a wire wound coating rod providing a wet coating weight of about 20 lb. per 3000 sq. ft. The coating was dried in a forced air oven with an air temperature of about 280° F., resulting in a dry coating weight of about 10 lb. per 3000 sq. ft.

The coated produce of this example was a silicone polymer coated paper with a thermoplastic coating on the surface of the paper opposite the silicone polymer coating. The thermoplastic polymer of the thermoplastic coating on the side of the paper opposite the silicone polymer coating will be referred to herein as a second film-forming thermoplastic polymer to distinguish it from thermoplastic polymers used in other ways in other examples.

The results of tests to evaluate the material of this example as a pouch material are presented in Table VIII.

Figure 17:
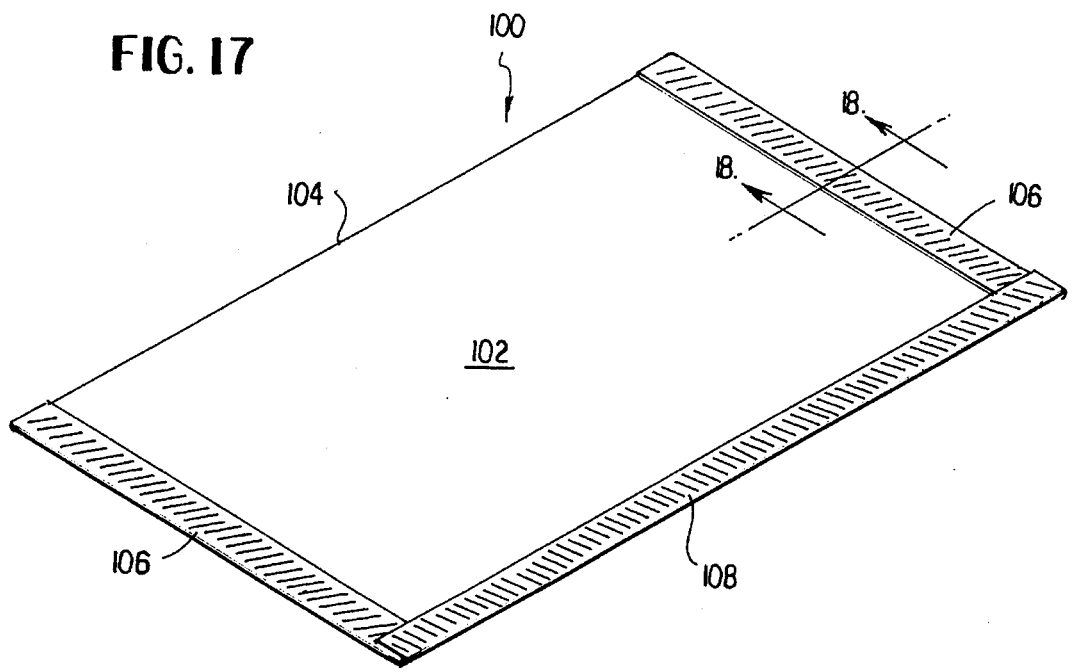
FIG. 17 is a perspective view of a third pouch formed in accordance with this invention.
Figure 18:
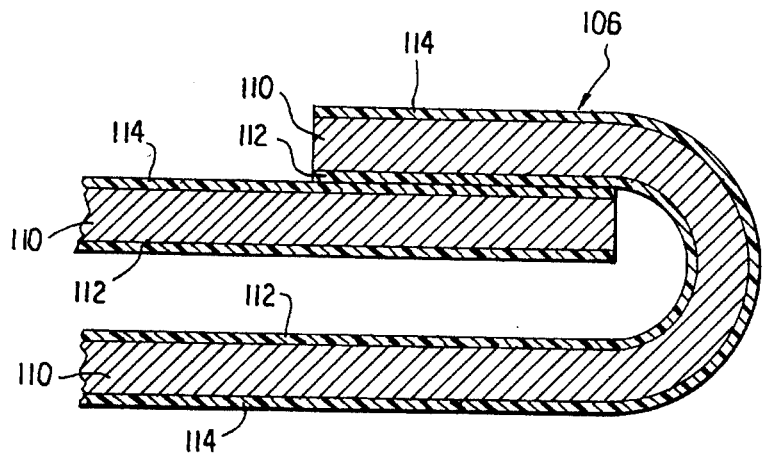
FIG. 18 is a view taken along section 18—18 of FIG. 17.

It will be noted that the silicone polymer coated paper of this example provided a peelable seal for a 1:2 type seal, but there was no 1:1 type seal formed at sealing temperatures as high as 350° F. A pouch material with these sealing characteristics will be acceptable for some packaging applications where the design of the package is such that 1:1 type seals are not required. FIG. 17 shows pouch 100 that requires only 1:2 type seals. Pouch 100 is formed from a single sheet of silicone polymer coated paper 102 folded along edge 104 with the silicone polymer coated surface forming the internal surface of the pouch. Seams 106 and 108 are formed by first folding over extended portions of the underply of pouch 100 in the manner shown in FIG. 18, which is a cross-sectional view of a portion of a seam area that has been left unsealed, as would be done in some cases to provide an opening for inserting a product into the pouch. In FIG. 18, the paper substrate of the silicone polymer coated paper is designated as 110, the silicone polymer coating is designated as 112, and the thermoplastic coating on the surface of the paper opposite the silicone coating is designated as 114. To seal the seams of a pouch of the type shown in FIG. 17, with the materials arranged in the seam areas as shown in FIG. 18, it is only necessary to form 1:2 type seals.

EXAMPLE 71

The silicone polymer coated paper produced in example 62 was modified by applying a thermoplastic coating on the surface opposite the silicone coating (the second surface) with the same acrylic copolymer emulsion, Hycar 26373, that was used for the basecoat in example 62. The Hycar 26373 emulsion was applied without dilution on the second surface of the paper using a wire wound coating rod providing a wet coating weight of about 15 lb. per 3000 sq. ft. The coating was dried in a forced air oven with an air temperature of about 90° C., resulting in a dry coating weight of about 9 lb. per 3000 sq. ft.

The coated product of this example was a silicone polymer coated paper with a thermoplastic basecoat and with a thermoplastic coating on the surface of the paper opposite the silicone polymer coating.

Figure 22:
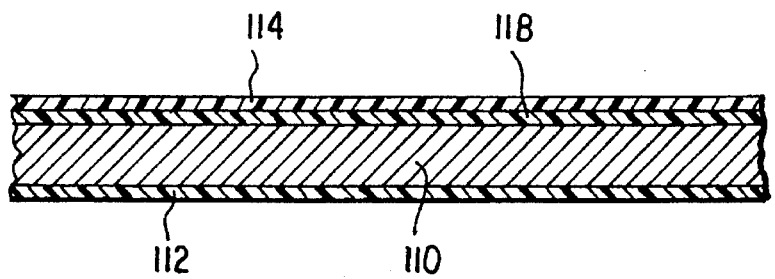
FIG. 22 is a sectional view of an additional alternate type of sheet material used to form the pouch of this invention.

The results of tests to evaluate the material of this example as a pouch material are presented in Table VIII. FIG. 22 illustrates the material of this Example, which can be used to make pouches of the type shown in FIGS. 1, 2, and 3. In FIG. 22, the paper substrate of the silicone polymer coated paper is designated as 110, the silicone polymer coating is designated as 114, the thermoplastic basecoat is designated as 118, and the thermoplastic coating on the surface of the paper opposite the silicone coating designated as 112.

EXAMPLE 72

The silicone polymer coated paper produced in example 65 was modified by applying a thermoplastic coating on the surface opposite the silicone coating (the second surface) with a water-based emulsion of an ethylene vinyl acetate copolymer. The ethylene vinyl acetate copolymer emulsion, namely Airflex 421, was supplied by Air Products of Allentown, Pa. This emulsion, as supplied, contains about 52% solids by weight of an ethylene vinyl acetate copolymer with a glass transition temperature of 0° C. The Airflex 421 emulsion was applied without dilution on the second surface of the paper with a wire wound coating rod providing a wet coating weight of about 14 lb. per 3000 sq. ft. The coating was dried in a forced air oven at 90° C., resulting in a dry coating weight of about 7 lb. per 3000 sq. ft.

The coated product of this example was a silicone polymer coated paper with an admixed thermoplastic polymer included in the silicone polymer coating and with a thermoplastic coating on the surface of the paper opposite the silicone polymer coating.

The results of tests to evaluate the material of this example as a pouch material are presented in Table VIII.

Figure 23:
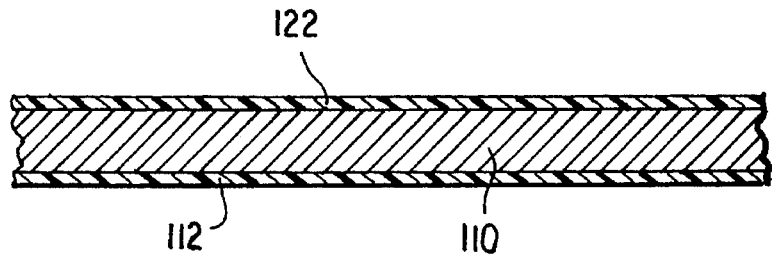
FIG. 23 is a sectional view of yet another alternate type of sheet material used to form the container of this invention.

Examples 58 through 72 show that the basic concepts of this invention can be used to produce pouches with inward-facing silicone polymer coated surfaces and sealed edges from silicone polymer coated papers that include one or more thermoplastic components provided in the form of water-based emulsions or dispersions. It is to be understood that the scope of this invention is not limited to the use of the specific materials used in the examples. Water-based emulsions and dispersions other than those used in examples 58 through 72 can be used to produce either thermoplastic basecoats or thermoplastic coatings on the side of the paper opposite the silicone coating, or to provide an admixed thermoplastic polymer in the silicone polymer coating formulation. For example, a water-based dispersion of a water-soluble polymer, such as the ammonium salt of an ethylene/acrylic acid copolymer, might be used for either thermoplastic coating. As another alternative, the thermoplastic polymer could be provided as a water-based dispersion of a powder, such as a polyethylene powder. It is also permissible to use water-based emulsions or dispersions that contain more than one polymer, such as an emulsion containing both an ethylene/vinyl acetate copolymer and a vinyl acetate homopolymer. In those embodiments of the invention that utilize water-based emulsions or dispersions of thermoplastic polymers in more than one layer of the coated paper product, different thermoplastic polymers may be used in different parts of the structure. For example, where the product has both a thermoplastic basecoat and an admixed thermoplastic polymer included in the silicone polymer coating, these need not be the same type of polymer. FIG. 23 illustrates the material of this Example, which can be used to make pouches of the type shown in FIGS. 1, 2, and 3. In FIG. 23, the paper substrate of the silicone polymer is designated as 110, the silicon coating containing an admixed thermoplastic polymer is designated as 122, and the thermoplastic coating on the surface of the paper opposite the silicone coating is designated as 112.

TABLE VIII

Evaluations of Pouch Materials of Examples 58–72
Sealing Characteristics

| Example | Embossing Plate | Temperature (°F.) | Pressure (psi) | Contact Time (seconds) | Trifold Seal Quality 1:1 Seal | 1:2 Seal | Release Valve Tappi UM 502 (gm/in) |
|---|---|---|---|---|---|---|---|
| 58 | Q3832-1M with ⅛" thick rubber pad | 200 | 375 | 0.25 | 6 | 9 | 90 |
| 59 | Q3832-1M with ⅛" thick rubber pad | 175 | 375 | 0.25 | 7 | D | 25 |
| 60 | Q3832-1M with ⅛" thick rubber pad | 250 | 375 | 0.25 | 6 | 8 | 14 |
| 61 | Q3832-1M with ⅛" thick rubber pad | 200 | 375 | 0.25 | 6 | D | 90 |
| 62 | Q3832-1M with ⅛" thick rubber pad | 300 | 375 | 0.25 | 6 | 9 | 12 |
| 63 | Q3832-1M with ⅛" thick rubber pad | 250 | 375 | 0.25 | 7 | D | 40 |
| 64 | Q3832-1M with ⅛" thick rubber pad | 300 | 375 | 0.25 | 7 | D | 45 |
| 65 | Q3832-1M with ⅛" thick rubber pad | 350 | 375 | 5 | D | 2 | 80 |
| 66 | Q3832-1M with ⅛" thick rubber pad | 350 | 375 | 2 | 5 | 5 | 22 |
| 67 | Q3832-1M with ⅛" thick rubber pad | 250 | 375 | 0.25 | 9 | 7 | 40 |
| 68 | Q3832-1 with ⅛" thick rubber pad | 250 | 450 | 0.25 | 9 | 9 | 95 |
| 69 | Q3832-1M with ⅛" thick rubber pad | 250 | 450 | 0.25 | 7 | 9 | 55 |
| 70 | Q3832-1M with ⅛" thick rubber pad | 350 | 375 | 0.25 | 0 | 9 | 25 |
| 71 | Q3832-1M with ⅛" thick rubber pad | 350 | 375 | 2 | 9–10 | 9–10 | 80 |
| 72 | Q3832-1M with ⅛" thick rubber pad | 350 | 375 | 2 | D | D | 80 |

We claim:

1. A flexible container in the form of a pouch, a bag, or an envelope, said container being formed at least partially from a silicone polymer coated paper, said silicone polymer coated paper comprised of a paper substrate having a first surface and a second surface, a silicone polymer coating on said first paper surface, a thermoplastic coating on said second paper surface, said thermoplastic coating applied to said second paper surface as a water-based emulsion or dispersion of a thermoplastic polymer, said silicone polymer coating on said first paper substrate surface forming a nonstick internal surface of said flexible container, said flexible container having at least one embossed side seam where a seal is formed joining two overlapped edge zones, at least one of said two overlapped edge zones including said nonstick internal surface.

2. A flexible container in the form of a pouch, a bag, or an envelope, said container being formed at least partially from a silicone polymer coated paper, said silicone polymer coated paper comprised of a paper substrate having a first surface and a second surface, a thermoplastic basecoat on said first paper substrate surface, said thermoplastic basecoat coating applied to said first paper substrate surface as a water-based emulsion or dispersion of a thermoplastic polymer, a silicone polymer coating on said thermoplastic basecoat, said silicone polymer coating forming a nonstick internal surface of said flexible container, said flexible container having at least one embossed side seam where a seal is formed joining two overlapped edge zones, at least one of said two overlapped edge zones including said nonstick internal surface.

3. A flexible container in the form of a pouch, a bag, or an envelope, said container being formed at least partially from a silicone polymer coated paper, said silicone polymer coated paper comprised of a paper substrate having a first surface and a second surface, a silicone polymer coating on said first paper substrate surface, a thermoplastic polymer included in said silicone polymer coating, said silicone polymer coating and said thermoplastic polymer applied to said first paper surface as a water based emulsion or dispersion, said thermoplastic polymer being admixed with said silicone polymer coating, said silicone polymer coating forming a nonstick internal surface of said flexible container, said flexible container having at least one embossed side seam where a seal is formed joining two overlapped edge zones, at least one of said two overlapped edge zones including said nonstick internal surface.

4. The flexible container of claim 2 including a second thermoplastic coating applied to said second paper substrate surface as a water based emulsion or dispersion.

5. The flexible container of claim 1 wherein said silicone polymer coating on said first paper substrate surface includes an admixed thermoplastic polymer, said silicone polymer coating and said admixed thermoplastic polymer applied to said first paper substrate surface as a water based emulsion or dispersion.

6. The flexible container of claim 2 wherein said silicone polymer coating on said thermoplastic basecoat includes an admixed thermoplastic polymer, said silicone polymer coating and said admixed thermoplastic polymer applied to said thermoplastic basecoat as a water based emulsion or dispersion.

7. The flexible container of claim 2 wherein said thermoplastic polymer is selected from the group consisting of ethylene vinyl acetate copolymers, polyvinyl acetate, ethylene vinyl chloride copolymers, acrylic copolymers, vinylidene chloride copolymers and styrene.

8. The flexible container of claim 3 wherein said thermoplastic polymer is an ethylene vinyl acetate copolymer.

9. The flexible container of claim 1 wherein said thermoplastic polymer is an ethylene vinyl acetate copolymer or an acrylic copolymer.

10. The flexible container of claim 1 wherein said thermoplastic polymer is selected from the group consisting of ethylene vinyl acetate copolymers, polyvinyl acetate, ethylene vinyl chloride copolymers, acrylic copolymers, vinylidene chloride copolymers and styrene.

11. The flexible container of claim 3 wherein said thermoplastic polymer is selected from the group consisting of ethylene vinyl acetate copolymers, polyvinyl acetate, ethylene vinyl chloride copolymers, acrylic copolymers, vinylidene chloride copolymers and styrene.

12. The flexible container of claim 4 wherein said thermoplastic polymer is selected from the group consisting of ethylene vinyl acetate copolymers, polyvinyl acetate, ethylene vinyl chloride copolymers, acrylic copolymers, vinylidene chloride copolymers and styrene.

13. The flexible container of claim 5 wherein said thermoplastic polymer is selected from the group, consisting of ethylene vinyl acetate copolymers, polyvinyl acetate, ethylene vinyl chloride copolymers, acrylic copolymers, vinylidene chloride copolymers and styrene.

14. The flexible container of claim 6 wherein said thermoplastic polymer is selected from the group consisting of ethylene vinyl acetate copolymers, polyvinyl acetate, ethylene vinyl chloride copolymers, acrylic copolymers, vinylidene chloride copolymers and styrene.

* * * * *